(12) United States Patent
Achtien et al.

(10) Patent No.: US 10,820,358 B2
(45) Date of Patent: Oct. 27, 2020

(54) BLUETOOTH LOW ENERGY CONNECTION MANAGEMENT

(71) Applicant: JUUL Labs, Inc., San Francisco, CA (US)

(72) Inventors: Nicholas Achtien, San Francisco, CA (US); Erik R. Babel, Oakland, CA (US); Travis I. Wyatt, Oakland, CA (US); Casey S. Yost, Daly City, CA (US)

(73) Assignee: JUUL Labs, Inc., San Francisco, CA (US)

( * ) Notice: Subject to any disclaimer, the term of this patent is extended or adjusted under 35 U.S.C. 154(b) by 0 days.

(21) Appl. No.: 16/517,589

(22) Filed: Jul. 20, 2019

(65) Prior Publication Data

US 2020/0029371 A1     Jan. 23, 2020

Related U.S. Application Data

(60) Provisional application No. 62/701,425, filed on Jul. 20, 2018.

(51) Int. Cl.
*G06Q 20/32* (2012.01)
*H04W 76/10* (2018.01)
(Continued)

(52) U.S. Cl.
CPC .......... *H04W 76/10* (2018.02); *G06F 13/102* (2013.01); *H04W 4/80* (2018.02)

(58) Field of Classification Search
None
See application file for complete search history.

(56) References Cited

U.S. PATENT DOCUMENTS 7,688,718 B2 * 3/2010 Bhardwaj ............ H04W 28/06
                                                   370/225
8,116,223 B2 * 2/2012 Tian .................... H04L 47/824
                                                   370/252

(Continued)

FOREIGN PATENT DOCUMENTS

EP          3190747 A1     7/2017

OTHER PUBLICATIONS

Anonymous: "Lock (computer science)—Wikipedia", Jan. 17, 2012, retrieved from the internet: https://en.wikipedia.org/w/index.php?title=Lock_(computer_science)&oldid=471818463.

*Primary Examiner* — Tuan A Tran
(74) *Attorney, Agent, or Firm* — Mintz Levin Cohn Ferris Glovsky and Popeo, P.C.

(57) ABSTRACT

A Bluetooth Low Energy (BLE)-enabled digital device, such as a smartphone, can communicate with a BLE-enabled peripheral device via a BLE connection. The peripheral device may be a vaporizer, and the smartphone can include feature(s) related to control of the vaporizer. A method for maintaining a BLE connection between the smartphone, which may execute an Android operating system, and the peripheral device is also provided. The method may include utilizing a library of suspension functions in the form of an Application Programming Interface (API) for an Android BLE framework. The suspension functions can be implemented using coroutines that allow suspending BLE operations without locking a thread. The library may include a module communicating with a core of the library and configured to suspend requested BLE operations while attempting to reestablish a lost connection until a timeout event occurs. The module can be configured to handle BLE state machine complexities.

46 Claims, 11 Drawing Sheets

(51) Int. Cl.
*H04W 4/80* (2018.01)
*G06F 13/10* (2006.01)

(56) References Cited

U.S. PATENT DOCUMENTS

| | | | | |
|---|---|---|---|---|
| 8,385,829 | B2* | 2/2013 | Lin | H04W 48/16 |
| | | | | 455/41.2 |
| 8,595,810 | B1* | 11/2013 | Ben Ayed | H04W 12/0608 |
| | | | | 726/8 |
| 9,808,071 | B2* | 11/2017 | Thiebaut | B01F 13/1058 |
| 10,005,657 | B2* | 6/2018 | Lim | B67D 1/0878 |
| 10,076,137 | B2* | 9/2018 | Krietzman | A24B 15/16 |
| 10,265,245 | B2* | 4/2019 | Kraft | A61J 7/0418 |
| 10,314,740 | B2* | 6/2019 | Kraft | A61F 9/0008 |
| 10,403,079 | B2* | 9/2019 | Wegelin | A47K 5/1217 |
| 10,420,708 | B2* | 9/2019 | Arric | A61J 7/0454 |
| 10,435,285 | B2* | 10/2019 | Lim | G07F 13/065 |
| 10,630,647 | B2* | 4/2020 | McLaughlin | H04W 4/80 |
| 2010/0015919 | A1* | 1/2010 | Tian | H04W 12/06 |
| | | | | 455/41.2 |
| 2016/0171811 | A1* | 6/2016 | Khamphilapanyo | G07F 7/08 |
| | | | | 700/231 |
| 2016/0262193 | A1* | 9/2016 | Hariharan | H04W 76/10 |
| 2017/0109722 | A1* | 4/2017 | Morris | G06Q 50/06 |
| 2017/0169418 | A1* | 6/2017 | Bellenger | G06Q 20/327 |
| 2019/0244205 | A1* | 8/2019 | Fieglein | G06Q 20/325 |

* cited by examiner

BLUETOOTH LOW ENERGY CONNECTION MANAGEMENT

CROSS REFERENCE

The present application claims priority to U.S. Provisional Patent Application No. 62/701,425 entitled "Bluetooth Low Energy Connection Management" filed Jul. 20, 2018, which is hereby incorporated by reference in its entirety.

TECHNICAL FIELD

The apparatuses, devices, systems, and methods described herein relate to Bluetooth Low Energy (BLE)-enabled devices, and to methods for implementing and managing communication between the BLE devices.

BACKGROUND

Bluetooth provides a way for exchanging data wirelessly over short distances between Bluetooth-enabled devices. Bluetooth Low Energy (BLE) provides wireless network technology that allows for communication between BLE-enabled devices with reduced power consumption at communication ranges similar to ranges provided by standard Bluetooth. Mobile operating systems for smartphones and other devices, including, for example, Android, iOS, Windows Phone, and BlackBerry, support BLE protocol.

Various devices may communicate over a BLE connection. Thus, a peripheral device, such as a sensor, headset, wearable fitness device, vaporizer, or any other device, can communicate with a mobile device such as a smartphone over a BLE connection. Vaporizing devices, which can also be referred to as vaporizers, electronic vaporizer devices, or e-vaporizer devices, can communicate with a mobile device or another computing device over a wireless connection such as a BLE connection. Electronic vaporizer devices can be used for delivery of an aerosol (or "vapor") containing one or more active ingredients by inhalation of the aerosol by a user of the vaporizing device. For example, electronic nicotine delivery systems (ENDS) include a class of vaporizer devices that are battery powered and that may be used to simulate the experience of smoking, but without burning of tobacco or other substances. Electronic vaporizer devices may wirelessly communicate with a smartphone that operates as an external controller for such devices.

Some operating systems for mobile devices provide tools for interacting with BLE-enabled devices. For example, Android is a software platform developed by Google to operate mobile devices. The Android platform provides tools for interacting with BLE-enabled devices, but the tools, as well as tools from other software platforms, have some shortcomings. For example, the implementation of a BLE framework in an Android operating system may be accompanied by non-descriptive errors states, is not thread-safe, and has complicated, not user- or execution-friendly callback structure. This may complicate implementation and execution of BLE-related applications for Android devices.

The systems, apparatuses, devices, and methods described herein address at least these problems and concerns.

SUMMARY

Aspects of the current subject matter relate to control of communication between BLE-enabled devices. Aspects of the current subject matter also relate to tools that allow implementing features of the Android BLE framework for communication between BLE-enabled devices.

In some aspects, a method of communication with a BLE-enabled peripheral device is provided. The method includes establishing a BLE connection with the BLE-enabled peripheral device; sending, by at least one processor of a central device, a request to the BLE-enabled peripheral device for access to BLE data pertaining to BLE services at the BLE-enabled peripheral device; determining, by the at least one processor, whether a locking module of the central device is locked so as to indicate inaccessibility of the BLE data via the BLE connection, the determining comprising accessing the locking module; suspending, by the at least one processor in response to the determining that the locking module is locked, performance of an operation comprising the request; determining, by the at least one processor, whether the locking module has become unlocked; and allowing, by the at least one processor in response to the determining that the locking module is unlocked, resumption of the performance of the operation including the request, the operation enabling access to the BLE data pertaining to the BLE services at the BLE-enabled peripheral device.

The method can vary in various ways. For example, in some embodiments, the locking module can be locked while the BLE connection becomes unavailable, and the locking module can become unlocked once the unavailable BLE connection becomes available. For another example, the locking module can become unlocked once the operation has been performed.

In some embodiments, the request includes a request to discover the BLE services available at the BLE-enabled peripheral device. In some embodiments, the request includes a request to read data from the BLE data that is stored in a memory of the BLE-enabled peripheral device. The request to read the data can comprise a request to read a characteristic from BLE Generic Attribute Profile (GATT) that is stored in the memory of the BLE-enabled peripheral device. In some embodiments, the request includes a request to write data to a memory of the BLE-enabled peripheral device storing the BLE data. The request to write the data can include a request to write a characteristic to BLE GATT stored in the memory of the BLE-enabled peripheral device.

In some embodiments, the method further includes receiving, by the at least one processor and via a separate channel, a result of the operation comprising a response to the request. The separate channel can be provided by the locking module. In some implementations of the current subject matter, the locking module can include or can be Mutex.

In some embodiments, the performance of the operation includes execution of a suspending function configured to suspend a coroutine without blocking the current thread. The suspending function can be included in an Application Programming Interface (API) for an Android BLE framework.

In some embodiments, the request can be or can include a message generated for processing by a messenger module, the messenger module comprising the locking module and an actor, and the messenger module can be configured to process the request on a dedicated thread. In other embodiments, the request can be or can include a message generated for processing by a context module configured to communicate with the locking module and to process the request on a dedicated thread.

In some embodiments, the method further includes operating the at least one processor to execute a connector module configured to handle a BLE state machine, such that the connector module is configured to suspend a current operation while the connector module handles the BLE state machine. The connector module can be further configured to maintain the current operation suspended while attempting to reestablish the BLE connection, and the attempting can be performed until a time out event occurs.

In some embodiments, the BLE-enabled peripheral device can be a vaporizer. In other embodiments, the BLE-enabled peripheral device can be or can include a device selected from the group consisting of at least one sensor, a headset, and a wearable fitness device.

In some aspects, a BLE-enabled mobile device is provided that includes at least one processor and at least one memory storing instructions. The instructions, when executed by the at least one processor, cause the BLE-enabled mobile device to at least: establish a BLE connection with a BLE-enabled peripheral device; after the BLE connection has been established, initiate performance of an operation related to accessing BLE services at the BLE-enabled peripheral device; determine whether the BLE connection is available; suspend performance of the operation if it is determined that the BLE connection is unavailable, the performance of the operation being suspended without blocking a current thread; and resume performance of the operation if it is determined that the BLE connection is available.

The BLE-enabled mobile device can vary in various ways. For example, in some embodiments, the instructions, when executed by the at least one processor, can further cause the BLE-enabled mobile device to resume the performance of the suspended operation if it is determined that the unavailable BLE connection becomes available.

In some embodiments, the instructions, when executed by the at least one processor, can further cause the BLE-enabled mobile device to generate a result of the operation when the performance of the operation is resumed.

In some embodiments, the BLE-enabled peripheral device can be a vaporizer. In other embodiments, the BLE-enabled peripheral device can be or can include a device selected from the group consisting of at least one sensor, a headset, and a wearable fitness device.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to electronic vaporizer devices, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
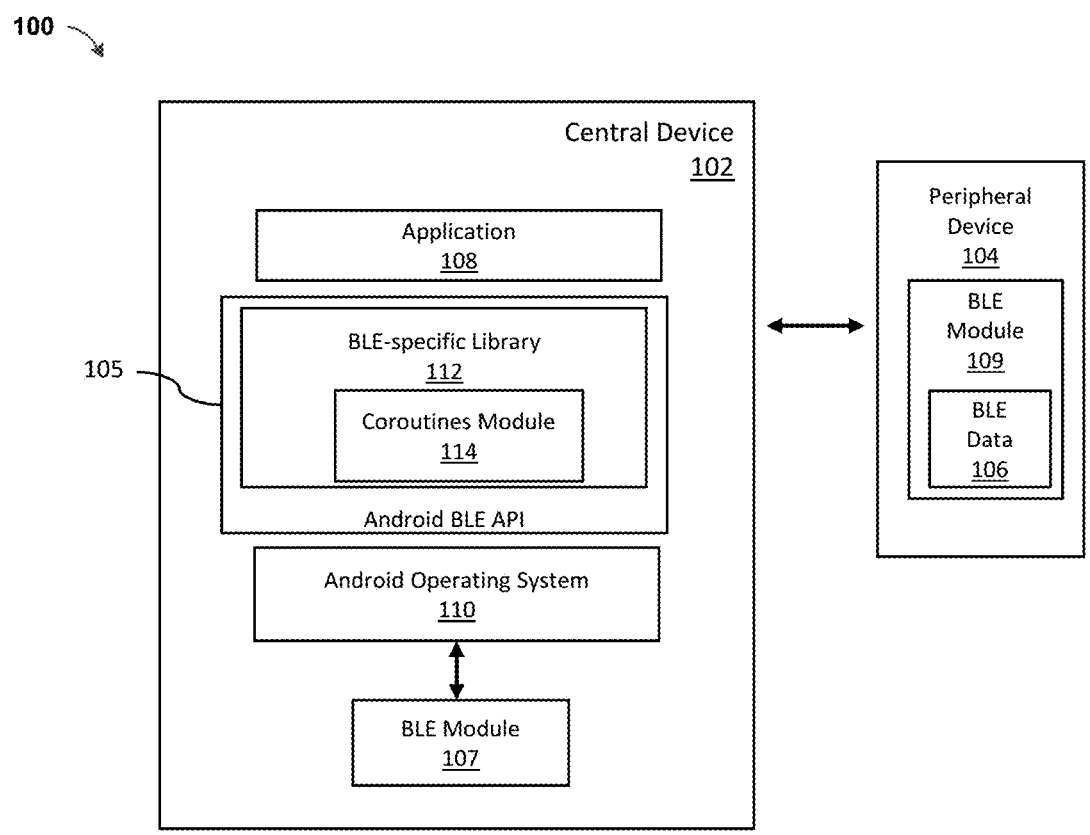
FIG. 1A is a block diagram illustrating a system in which some embodiments may be implemented in accordance with some example implementations.

Implementations of the current subject matter include methods, devices, and systems relating to Bluetooth Low Energy (BLE)-enabled devices that are configured to communicate over a BLE connection. The devices may include a central digital device, such as, for example, a mobile device (e.g., a smartphone) that can communicate with a mobile or fixed peripheral device over a BLE connection. The peripheral device can be a vaporizer that can communicate with the mobile device over the BLE connection such that the vaporizer is controlled via the user's mobile device. It should be appreciated, however, that the peripheral device can be any other suitable BLE-enabled device configured to communicate with the BLE-enabled central device over a BLE connection, as the described embodiments are not limited to communication with a vaporizer.

A framework that allows central and peripheral devices to communicate with one another over a BLE connection can be based on the Android operating system framework for BLE applications. Thus, the user's mobile device executing the Android operating system is required to access BLE services available at the peripheral device. However, some of the features of the Android BLE framework have shortcomings. For example, Android callback structure can be complicated, even confusing, to implement, and various errors (which may not be straightforward to interpret) can occur. Handling concurrency using threads on an Android operating system may be challenging. Threads are costly to maintain and to switch to, which may lead to excessive use of memory, decrease in performance and increase in cost.

In some implementations of the current subject matter, an Android BLE framework is utilized that includes functions implemented in the Kotlin® programming language developed by JetBrains. In particular, Kotlin® provides suspending functions that can be used instead of Android BLE functions and that allow avoiding use of complicated callbacks of the Android BLE framework. For example, suspending functions may have corresponding BluetoothGattCallback functions, and non-limiting examples of the suspending functions include the following BluetoothGatt functions (listed along with respective corresponding BluetoothGattCallback functions):

| BluetoothGatt function | BluetoothGattCallback function |
| --- | --- |
| discoverServices | onServicesDiscovered |
| readCharacteristic | onCharacteristicRead |
| readDescriptor | onDescriptorRead |
| requestMtu | onMtuChanged |
| writeCharacteristic | onCharacteristicWrite |

Kotlin® suspending functions are used to implement coroutines, which can be defined as computations that can be suspended without blocking a current thread, such that the thread is released to perform other work. Coroutines in Kotlin® behave similarly to light-weight threads. Coroutines are suspendable such that, instead of blocking a thread, they stop when required without blocking a thread, and then resume processing. Threads, however, spend a large amount of time in a blocking state. Because coroutines have little overhead and thus allow more efficient processor utilization, a larger number of coroutines can be executed at once as compared to a number of threads. Accordingly, instead of using callbacks, Kotlin® coroutines allow implementing asynchronous operations in a sequential/synchronous manner. Multiple coroutines may be launched without blocking a current thread.

In some implementations of the current subject matter, a method of communication with a BLE-enabled peripheral device is provided that includes establishing a BLE connection with the BLE-enabled peripheral device. Once the BLE connection has been established, an operation comprising a request to the BLE-enabled peripheral device to access BLE services at the BLE-enabled peripheral device may be performed. The performance of the operation may include determining, by the at least one processor, that a locking module is locked, which involves accessing the locking module. The locking module may be a Mutex module that is locked when the BLE connection becomes unavailable (e.g., lost or interrupted). The Mutex is a shared resource that can be locked or unlocked.

Thus, if it is determined that the locking module is locked, the performance of the operation (which result cannot be yet provided) may be suspended, which is done in the described implementations without blocking a current thread. The operation remains suspended until it is determined that the locking module is unlocked, which happens when the BLE connection becomes available. When it is determined that the locking module is unlocked, performance of the suspended operation is resumed after the suspension, and a result of the operation may be provided. The result comprises a list of BLE services discovered at the peripheral device, data acquired from the BLE services (e.g., a characteristic of a service from the BLE services), an indication of the successful completion of the operation (e.g., a value indicating that a characteristic has been written into the BLE services), or any other type of a result that depends on a type of the operation.

In accordance with some implementation of the current subject matter, as discussed in more detail below, a coroutine actor with Mutex is used to provide a mechanism for sequential execution of BLE operations, and provides a dedicated thread (e.g., "newFixedThreadPoolContext") on which Android BLE operations are performed. The described embodiments thus allow the BLE framework to be implemented in a thread-safe manner, which reduces the likelihood of errors.

As mentioned above, the peripheral device may be a vaporizer or a vaporizer system. The term "vaporizer" is used generically in the following description and claims to refer to any of a self-contained apparatus, an apparatus that includes two or more separable parts (e.g., a vaporizer body that includes a battery and/or other hardware, and a cartridge that includes and/or is configured to hold a vaporizable material), and/or the like. A "vaporizer system" as used herein may include one or more components, such as a device in communication (e.g., wirelessly or over a wired connection) with a vaporizer and optionally also the vaporizer itself. A vaporizer or one or more components of a vaporizer system consistent with implementations of the current subject matter may be configured for user control and operation. As used herein, an "aerosol" may refer to "vapor" and/or a "vaporizer."

Consistent with some implementations of the current subject matter, improved Android BLE framework is provided that includes suspending functions utilizing coroutines. The coroutine-based implementation improves Android BLE framework, in terms of both development and execution.

FIG. 1A illustrates a block diagram of a system 100 in which some embodiments can be implemented. The system 100 includes a central device 102, running an Android operating system 110, and a peripheral device 104, which are both BLE-enabled devices configured to communicate over a BLE connection. The central device 102 has a BLE module 107 encompassing BLE functionality of the central device 102, and the peripheral device 104 similarly has a BLE module 109. The central and peripheral devices can communicate such that the central device 102 is configured to send commands to the peripheral device 104, including requests for information, and the peripheral device 104 is configured to provide various information to the central device 102.

The BLE specification defines Generic Attribute Profile (GATT) that establishes how to exchange profile and user data over a BLE connection. In this example, the central device 102 and the peripheral device 104 can be referred to as a GATT client and a GATT server, respectively. The GATT client typically sends requests to the GATT server and receives responses to the requests from the GATT server. The GATT client performs service discovery to identify what services are available at the GATT server. After completing service discovery, the GATT client can read and write user data, also referred to as BLE data, stored at the GATT server, as well as receive server-initiated updates. The GATT server stores user data that is accessible to the client. Thus, FIG. 1A illustrates that the peripheral device 104 stores in its memory BLE data 106 which may be organized as BLE services. The BLE data 106 may include GATT-based profiles encompassing the BLE services.

As schematically shown in FIG. 1A, the central device 102 executes the Android operating system 110. In some implementations of the current subject matter, an application 108, which can wirelessly connect to the BLE peripheral device 104, accesses functionality of the BLE module 107 via an Android BLE Application Programming Interface (API) 105. The Android BLE API 105, implemented in accordance with the current subject matter, encompasses a BLE-specific library 112 that includes a coroutines module 114. As discussed above, the BLE-specific library 112 can be implemented using Kotlin® programming language that provides coroutines. It should be appreciated that components of the central device 102, in particular, the application 108, the BLE-specific library 112, and the coroutines module 114 of the API 105, as well as the Android operating system 110, are shown as separate components for illustration purposes only.

Figure 8:
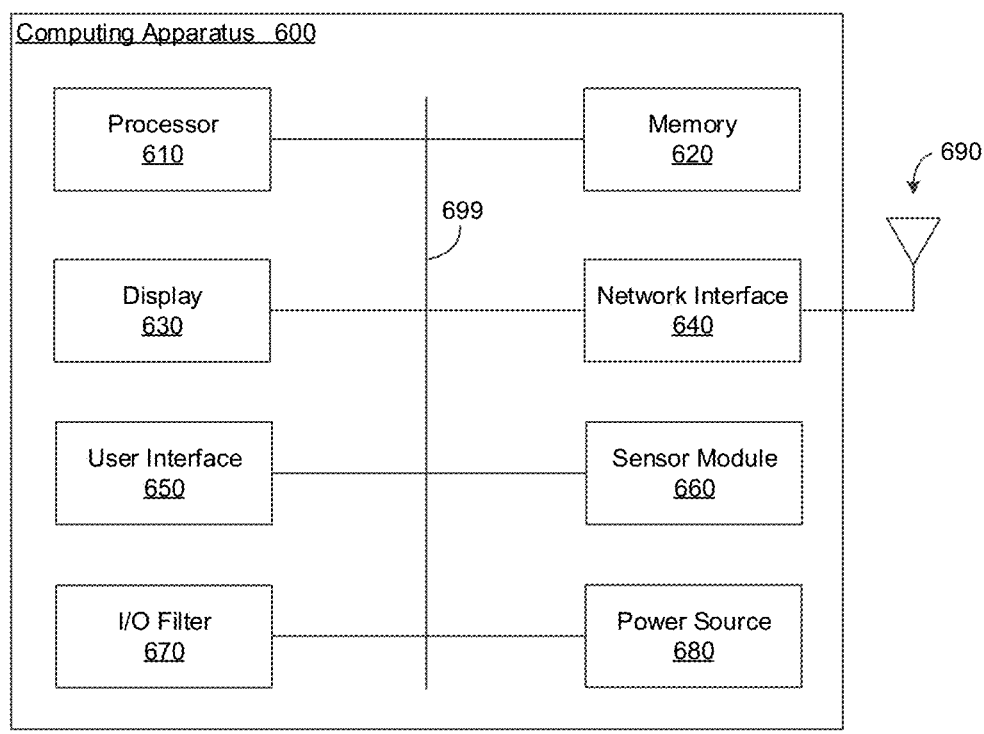
FIG. 8 is a schematic diagram illustrating a computing device in which some embodiments may be implemented.

It should further be appreciated that the central and peripheral devices 102, 104 can include various other components that are not shown in FIG. 1A. For example, the central device 102 includes at least one processor, at least one memory, as well as other components not shown in FIG. 1A for the sake of brevity. The central device 102 can be any suitable computing apparatus, and an example of a computing apparatus is shown in FIG. 8 described below.

Figure 1B:
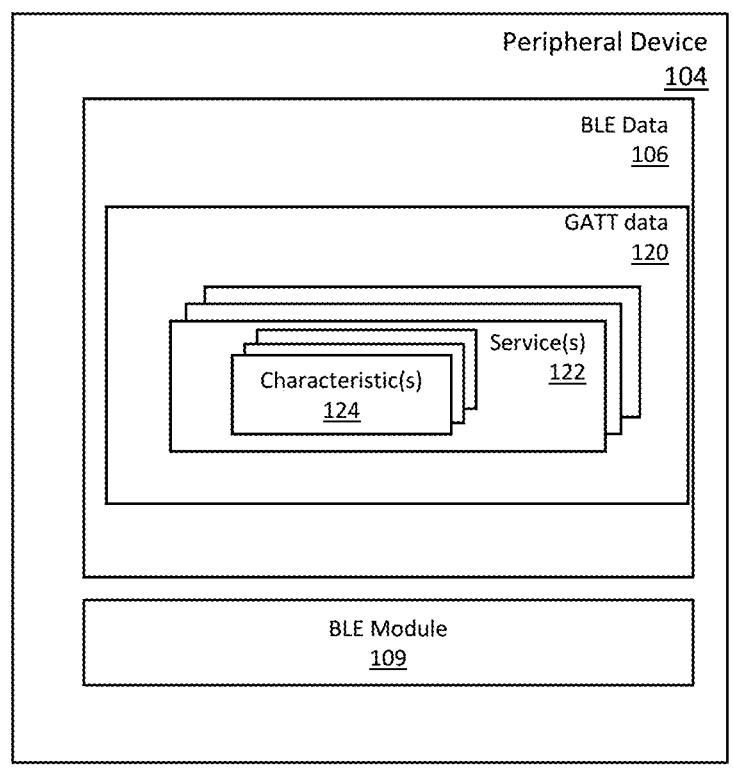
FIG. 1B is a block diagram illustrating a peripheral device of the system of FIG. 1A, in accordance with some example implementations.

In use, a BLE connection to the peripheral device 104 is established, and the application 108 is executed by at least one processor of the central device 102. This involves accessing the BLE-specific library 112 to perform operations related to requests to the peripheral device 104 to access the BLE data 106 of the peripheral device 104. The BLE data 106 is stored in memory of the peripheral device 104 such that the BLE data is accessible to the central device 102 over the BLE connection. FIG. 1B illustrates that the BLE data 106 available at the peripheral device 104 (sometimes also referred to as a "GATT server") includes GATT data 120 which includes BLE services 122 which, in turn, can include characteristic(s) 124. The BLE services 122 are shown in FIG. 1B schematically, as the services 122 include characteristics as well as relationships to other services. The BLE data 106 can include GATT profiles.

It should be noted that, although the BLE services 122 are shown in FIG. 1B to include characteristic(s) 124, some services 122 may have zero characteristics. The characteristic(s) 124, in turn, can include zero or more descriptors (not shown). The BLE services 122 allow the central device 102 to send requests to the peripheral device 104, via the BLE connection, to discover the BLE services 122, read, write, notify characteristics, as well as to configure broadcast of the characteristics. The central device 102 is configured to receive from the peripheral device 104 responses to the requests via the BLE connection.

It should be appreciated that both the central device 102 and the peripheral device 104 can act as either a GATT client or a GATT server. Furthermore, in some implementations, one or both of the central device 102 and the peripheral device 104 can act as both a GATT client and GATT server at the same time.

The central device 102 and the peripheral device 104 can be various types of devices configured to communicate over a BLE connection. It should be appreciated that the implementations of the current subject matter are not limited to a particular type of a peripheral device that can communicate with a central device over a BLE connection. Thus, the peripheral device may be, for example, a device encompassing one or more functionalities of a heart-rate monitor, a body temperature monitor, a scale, a blood pressure monitor, a respiratory rate monitor, a body motion monitor, a camera, glasses, and/or a device configured to acquire any other type of health-related data and/or data from a user environment. The peripheral device may be a wearable fitness device and/or a health device of any suitable type. Furthermore, in some embodiments, the peripheral device may be an environmental sensor device of a suitable type, such as, for example, a sensor configured to acquire temperature, humidity, chemical compounds, and other information from the surrounding environment. In some implementations of the current subject matter, the peripheral device is a vaporizing device.

Figure 2:
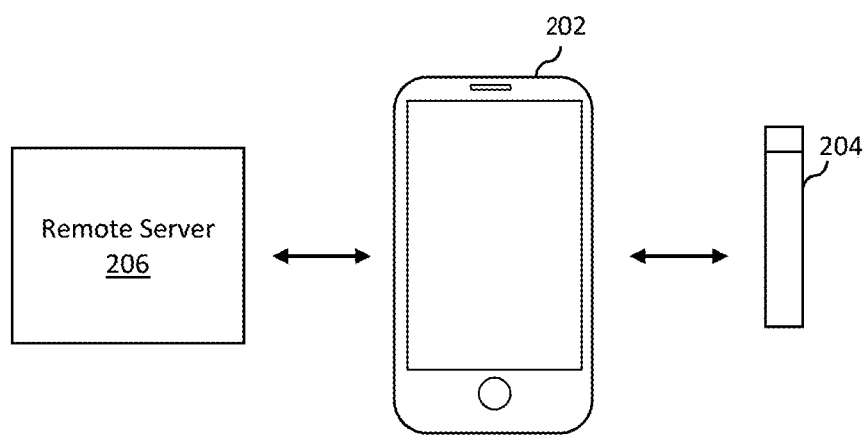
FIG. 2 is a schematic diagram illustrating the system of FIG. 1A, in which the peripheral device is a vaporizer, in accordance with some example implementations.
Figure 3:
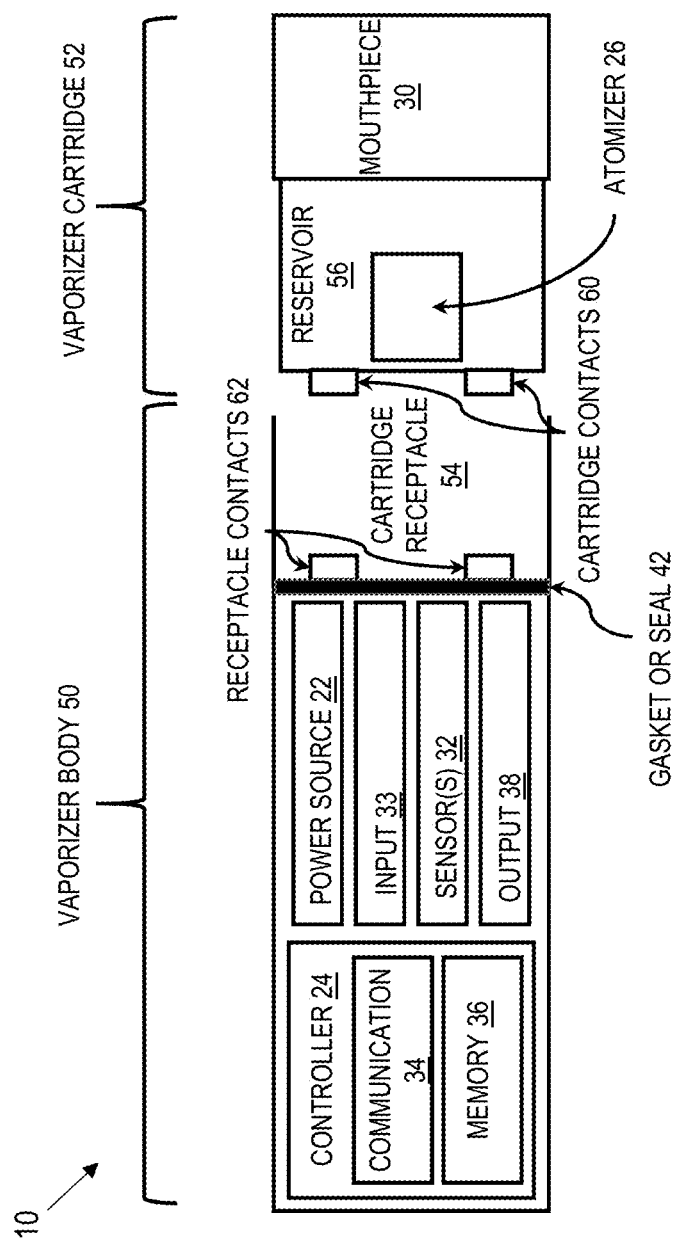
FIG. 3 is a block diagram illustrating an example of the vaporizer of FIG. 2, in accordance with some example implementations.

In some implementations of the current subject matter, as shown in FIG. 2, the central device (e.g., the central device 102) is a digital device 202, such as a user smartphone, and the peripheral device (e.g., the peripheral device 104) is a vaporizer 204, an example of which is shown in FIG. 3 as vaporizer 10. Although the central and peripheral devices described herein can communicate via a BLE connection, the devices may additionally include circuitry for one or more wireless communication modes such as, for example, near-field communication (NFC), WiFi, ultrasound, ZigBee, radio frequency identification (RFID), etc. Additionally, although the digital device 202 is shown in FIG. 2 as a smartphone, the digital device 202 may be any suitable portable and/or wearable device (e.g., a smartphone, smartwatch, tablet, and the like).

FIG. 2 shows a schematic representation of communication between the vaporizer 204 and the digital device 202 (also referred to as a "mobile device") that wirelessly communicates with the vaporizer 204, and a remote server 206 that may communicate directly with the vaporizer 204, or indirectly with the vaporizer 204 through the digital device 202. In general, as illustrated schematically in FIG. 2, any of the vaporizer apparatuses described herein (e.g., the vaporizer 204) may remotely communicate with a remote server 206 and/or the digital device 202. Thus, the vaporizer 204 can include a communications interface, such as wireless circuitry, that may be implemented through a communication chip (e.g., second communication hardware) in or on the vaporizer 204. Exemplary wireless chips may include, but are not limited to, a Bluetooth chip, such as Parani BCD 210 or Texas Instruments (TI) CC2650 Bluetooth Single-Chip Solution, an NFC-enabled chip (such as Qualcomm's QCA1990), that allows for NFC communication, or enhanced Wi-Fi or Bluetooth communication where NFC is used for link setup. Additionally, one or more of these wireless circuits may be used for communication with or between a cartridge of the vaporizer 204.

The mobile device 202 may be referred to as a "personal digital device" or optionally just a "device." Applications (also referred to as "apps") may be executed on a processor of the mobile device 202 to provide an interface for a user to engage and interact with functions related to the vaporizer 204, including communication of data to and from the vaporizer 204 to the mobile device 202 or the like and/or additional third party processor (e.g., servers such as the remote server 206). For example, a user may control some aspects of the vaporizer 204 (temperature, dosage, etc.) and/or data transmission and data receiving to and from vaporizer 204, optionally over a wireless communication channel between first communication hardware of the device 202 and second communication hardware of the vaporizer 204. Data may be communicated in response to one or more actions of the user (e.g., including interactions with a user interface displayed on the device 202), and/or as a background operation such that the user does not have to initiate or authorize the data communication process.

User interfaces may be deployed on a digital device (e.g., the device 202) and may aid the user in operating the vaporizer 204. For example, the user interface operating on a digital device (e.g., the device 202) may include icons and text elements that may inform the user of various ways that vaporizer settings can be adjusted or configured by the user. In this manner (or in others consistent with the current subject matter) information about a vaporizer (e.g., the vaporizer 204) can be presented using a user interface displayed by the digital device. Icons and/or text elements may be provided to allow a user to see information about vaporizer status, such as battery information (charge remaining, vapor draws remaining, time to charge, charging, etc.), cartridge status (e.g., type of cartridge and vaporizable material, fill status of cartridge, etc.), and similar device status. Icons and/or text elements may be provided to allow a user to update internal software (a.k.a., firmware) in the vaporizer. Icons and text elements may be provided to allow a user to set security and/or authorization features of vaporizer, such as setting a PIN code to activate the vaporizer or the use of personal biometric information as a means of authentication. Icons and text elements may be provided to allow a user to configure foreground data sharing and related settings. In the implementations of the current subject matter, the digital device and the vaporizer are configured to communicate via a BLE connection.

FIG. 3 illustrates an example of the vaporizer 204 in accordance with some implementations of the current subject matter. In general, implementations of a peripheral device in accordance with some embodiments include devices relating to vaporizing of one or more materials for inhalation by a user. The term "vaporizer" is used generically herein to refer to a vaporizer device. Examples of vaporizers consistent with implementations of the current subject matter include vaporizers, electronic vaporizer devices, or the like. Such vaporizers are generally portable, hand-held devices that heat a vaporizable material to provide an inhalable dose of the material. The vaporizable material used with a vaporizer may optionally be provided within a cartridge (e.g., a part of the vaporizer that contains the vaporizable material in a reservoir or other container and that can be refillable when empty or disposable in favor of a new cartridge containing additional vaporizable material of a same or different type). A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or the like for at least partially containing a usable amount of vaporizable material. In various implementations, a vaporizer may be configured for use with liquid vaporizable material (e.g., a carrier solution in which an active and/or inactive ingredient(s) are suspended or held in solution or a neat liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself (e.g., a "wax") such that all of the solid material can eventually be vaporized for inhalation. A liquid vaporizable material can likewise be capable of being completely vaporized or can include some part of the liquid material that remains after all of the material suitable for inhalation has been consumed Referring to the block diagram of FIG. 3, a vaporizer 10 typically includes a power source 22 (e.g., a battery which may be a rechargeable battery, etc.), and a controller 24 (e.g., a processor, circuitry, etc. capable of executing logic) for controlling delivery of heat to an atomizer 26 to cause a vaporizable material to be converted from a condensed form (e.g., a solid, a liquid, a solution, a suspension, a part of an at least partially unprocessed plant material, etc.) to the gas phase. The controller 24 may be part of one or more printed circuit boards (PCBs) consistent with certain implementations of the current subject matter. After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer 10 for a given puff or draw on the vaporizer 10. It will be understood that the interplay between gas and condensed phases in an aerosol generated by a vaporizer can be complex and dynamic, as factors such as ambient temperature, relative humidity, chemistry, flow conditions in airflow paths (both inside the vaporizer and in the airways of a human or other animal), mixing of the gas-phase or aerosol-phase vaporizable material with other air streams, etc. may affect one or more physical parameters of an aerosol. In some vaporizers, and particularly for vaporizers for delivery of more volatile vaporizable materials, the inhalable dose may exist predominantly in the gas phase (i.e., formation of condensed phase particles may be very limited).

Vaporizers for use with liquid vaporizable materials (e.g., neat liquids, suspensions, solutions, mixtures, etc.) typically include the atomizer 26, in which a wicking element, which can include any material capable of causing fluid motion by capillary pressure, conveys an amount of a liquid vaporizable material to a part of the atomizer 26 that includes a heating element. The wicking element is generally configured to draw liquid vaporizable material from a reservoir 56 configured to contain (and that may in use contain) the liquid vaporizable material such that the liquid vaporizable material may be vaporized by heat delivered from a heating element. The wicking element may also optionally allow air to enter the reservoir 56 to replace the volume of liquid removed. In other words, capillary action pulls liquid vaporizable material into the wick for vaporization by the heating element (described below), and air may, in some implementations of the current subject matter, return to the reservoir 56 through the wick to at least partially equalize pressure in the reservoir 56. Other approaches to allowing air back into the reservoir 56 to equalize pressure are also within the scope of the current subject matter.

The heating element can be or can include one or more of a conductive heater, a radiative heater, and a convective heater. One type of heating element is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element. In some implementations of the current subject matter, an atomizer can include a heating element that includes resistive coil or other heating element wrapped around, positioned within, integrated into a bulk shape of, pressed into thermal contact with, or otherwise arranged to deliver heat to a wicking element to cause a liquid vaporizable material drawn by the wicking element from the reservoir 56 to be vaporized for subsequent inhalation by a user in a gas and/or a condensed (e.g., aerosol particles or droplets) phase. Other wicking element, heating element, and/or atomizer assembly configurations are also possible, as discussed further below.

Certain vaporizers may also or alternatively be configured to create an inhalable dose of gas-phase and/or aerosol-phase vaporizable material via heating of a non-liquid vaporizable material, such as for example a solid-phase vaporizable material (e.g., a wax or the like) or plant material (e.g., tobacco leaves and/or parts of tobacco leaves) containing the vaporizable material. In such vaporizers, a resistive heating element may be part of or otherwise incorporated into or in thermal contact with the walls of an oven or other heating chamber into which the non-liquid vaporizable material is placed. Alternatively, a resistive heating element or elements may be used to heat air passing through or past the non-liquid vaporizable material to cause convective heating of the non-liquid vaporizable material. In still other examples, a resistive heating element or elements may be disposed in intimate contact with plant material such that direct conductive heating of the plant material occurs from within a mass of the plant material (e.g., as opposed to only by conduction inward form walls of an oven).

The heating element may be activated (e.g., the controller 24, which can be part of a vaporizer body 50 as discussed herein, may cause current to pass from the power source 22 through a circuit including the resistive heating element, which can be part of a vaporizer cartridge 52 as discussed herein), in association with a user puffing (e.g., drawing, inhaling, etc.) on a mouthpiece 30 of the vaporizer 10 to cause air to flow from an air inlet, along an airflow path that passes the atomizer 26 (e.g., wicking element and heating element), optionally through one or more condensation areas or chambers, to an air outlet in the mouthpiece 30. Incoming air passing along the airflow path passes over, through, etc. the atomizer 26, where gas-phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in the mouthpiece 30 for inhalation by a user).

Activation of the heating element may be caused by automatic detection of the puff based on one or more of signals generated by one or more sensors 32, such as for example a pressure sensor or sensors disposed to detect pressure along the airflow path relative to ambient pressure (or optionally to measure changes in absolute pressure), one or more motion sensors of the vaporizer 10, one or more flow sensors of the vaporizer 10, a capacitive lip sensor of the vaporizer 10, in response to detection of interaction of a user with one or more input devices 33 (e.g., buttons or other tactile control devices of the vaporizer 10), receipt of signals from a computing device in communication with the vaporizer 10, and/or via other approaches for determining that a puff is occurring or imminent.

As alluded to in the previous paragraph, a vaporizer consistent with implementations of the current subject matter may be configured to connect (e.g., wirelessly or via a wired connection) to a computing device (or optionally two or more devices) in communication with the vaporizer. To this end, the controller 24 may include communication hardware 34. The communication hardware 34 may include circuitry for one or more wireless communication modes, including Bluetooth (e.g., BLE), near-field communication (NFC), WiFi, ultrasound, ZigBee, RFID, etc. In some implementations of the current subject matter, the communication hardware 34 includes at least circuitry for a BLE communication mode.

The controller 24 can also include a memory 36. A computing device can be a component of a vaporizer system that also includes the vaporizer 10, and can include its own communication hardware, which can establish a wireless communication channel with the communication hardware 34 of the vaporizer 10. For example, a computing device used as part of a vaporizer system may include a general-purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer can also include one or more output features or devices 38 for providing information to the user.

A computing device that is part of a vaporizer system as defined above can be used for any of one or more functions, such as controlling dosing (e.g., dose monitoring, dose setting, dose limiting, user tracking, etc.), controlling sessioning (e.g., session monitoring, session setting, session limiting, user tracking, etc.), controlling nicotine delivery (e.g., switching between nicotine and non-nicotine vaporizable material, adjusting an amount of nicotine delivered, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities (e.g., games, social media communications, interacting with one or more groups, etc.) with other users, or the like. The terms "sessioning," "session," "vaporizer session," and "vapor session" are used generically to refer to a period devoted to the use of the vaporizer. The period can include a time period, a number of doses, an amount of vaporizable material, and/or the like.

In the example in which a computing device provides signals related to activation of the resistive heating element, or in other examples of coupling of a computing device with the vaporizer 10 for implementation of various control or other functions, the computing device executes one or more computer instructions sets to provide a user interface and underlying data handling. In one example, detection by the computing device of user interaction with one or more user interface elements can cause the computing device to signal the vaporizer 10 to activate the heating element, either to a full operating temperature for creation of an inhalable dose of vapor/aerosol. Other functions of the vaporizer 10 may be controlled by interaction of a user with a user interface on a computing device in communication with the vaporizer 10.

The temperature of a resistive heating element of the vaporizer 10 may depend on a number of factors, including an amount of electrical power delivered to the resistive heating element and/or a duty cycle at which the electrical power is delivered, conductive heat transfer to other parts of the vaporizer 10 and/or to the environment, latent heat losses due to vaporization of a vaporizable material from the wicking element and/or the atomizer 26 as a whole, and convective heat losses due to airflow (e.g., air moving across the heating element or the atomizer 26 as a whole when a user inhales on the vaporizer 10). As noted above, to reliably activate the heating element or heat the heating element to a desired temperature, the vaporizer 10 may, in some implementations of the current subject matter, make use of signals from a pressure sensor (e.g., sensor(s) 32), to determine when a user is inhaling. The pressure sensor can be positioned in the airflow path and/or can be connected (e.g., by a passageway or other path) to an airflow path connecting an inlet for air to enter the device 10 and an outlet via which the user inhales the resulting vapor and/or aerosol such that the pressure sensor experiences pressure changes concurrently with air passing through the vaporizer 10 from the air inlet to the air outlet. In some implementations of the current subject matter, the heating element may be activated in association with a user's puff, for example by automatic detection of the puff, for example by the pressure sensor detecting a pressure change in the airflow path.

Typically, the pressure sensor (as well as any other sensor(s) 32) can be positioned on or coupled (e.g., electrically or electronically connected, either physically or via a wireless connection) to the controller 24 (e.g., a printed circuit board assembly or other type of circuit board). To take measurements accurately and maintain durability of the vaporizer 10, it can be beneficial to provide a resilient seal 42 to separate an airflow path from other parts of the vaporizer. The seal 42, which can be a gasket, may be configured to at least partially surround the pressure sensor such that connections of the pressure sensor to internal circuitry of the vaporizer 10 are separated from a part of the pressure sensor exposed to the airflow path. In an example of a cartridge-based vaporizer, the gasket or seal 42 may also separate parts of one or more electrical connections between the vaporizer body 50 and the vaporizer cartridge 52. Such arrangements of the gasket or seal 42 in the vaporizer 10 can be helpful in mitigating against potentially disruptive impacts on vaporizer components resulting from interactions with environmental factors such as water in the vapor or liquid phases, other fluids such as the vaporizable material, etc. and/or to reduce escape of air from the designed airflow path in the vaporizer 10. Unwanted air, liquid or other fluid passing and/or contacting circuitry of the vaporizer 10 can cause various unwanted effects, such as alter pressure readings, and/or can result in the buildup of unwanted material, such as moisture, the vaporizable material, etc. in parts of the vaporizer 10 where they may result in poor pressure signal, degradation of the pressure sensor or other components, and/or a shorter life of the vaporizer 10. Leaks in the gasket or seal 42 can also result in a user inhaling air that has passed over parts of the vaporizer 10 containing or constructed of materials that may not be desirable to be inhaled.

A general class of vaporizers that have recently gained popularity includes the vaporizer body 50 that includes the controller 24, the power source 22 (e.g., battery, etc.), the one more sensors 32, charging contacts, a gasket or seal 42, and a cartridge receptacle 54 configured to receive the vaporizer cartridge 52 for coupling with the vaporizer body through one or more of a variety of attachment structures. In some examples, the vaporizer cartridge 52 includes the reservoir 56 for containing a liquid vaporizable material and the mouthpiece 30 for delivering an inhalable dose to a user. The vaporizer cartridge 52 can include the atomizer 26 having a wicking element and a heating element, or alternatively, one or both of the wicking element and the heating element can be part of the vaporizer body 50. In implementations in which any part of the atomizer 26 (e.g., heating element and/or wicking element) is part of the vaporizer body 50, the vaporizer 10 can be configured to supply liquid vaporizer material from the reservoir 56 in the vaporizer cartridge 52 to the atomizer part(s) included in the vaporizer body 50.

Cartridge-based configurations for vaporizers that generate an inhalable dose of a non-liquid vaporizable material via heating of a non-liquid vaporizable material are also within the scope of the current subject matter. For example, the vaporizer cartridge 52 may include a mass of a plant material that is processed and formed to have direct contact with parts of one or more resistive heating elements, and such a vaporizer cartridge 52 may be configured to be coupled mechanically and electrically to the vaporizer body 50 that includes the controller 24, the power source 22, and electrical contacts 62 for connecting to corresponding cartridge contacts 60 for completing a circuit with the one or more resistive heating elements.

In vaporizers in which the power source 22 is part of the vaporizer body 50 and a heating element is disposed in the vaporizer cartridge 52 configured to couple with the vaporizer body 50, the vaporizer 10 may include electrical connection features (e.g., means for completing a circuit) for completing a circuit that includes the controller 24 (e.g., a printed circuit board, a microcontroller, or the like), the power source 22, and the heating element. These features may include at least two contacts on a bottom surface of the vaporizer cartridge 52 (referred to herein as cartridge contacts 60) and at least two contacts disposed near a base of the cartridge receptacle (referred to herein as receptacle contacts 62) of the vaporizer 10 such that the cartridge contacts 60 and the receptacle contacts 62 make electrical connections when the vaporizer cartridge 52 is inserted into and coupled with the cartridge receptacle 54. The circuit completed by these electrical connections can allow delivery of electrical current to the resistive heating element and may further be used for additional functions, such as for example for measuring a resistance of the resistive heating element for use in determining and/or controlling a temperature of the resistive heating element based on a thermal coefficient of resistivity of the resistive heating element, for identifying the cartridge 52 based on one or more electrical characteristics of a resistive heating element or the other circuitry of the vaporizer cartridge 52, etc.

In some examples of the current subject matter, the at least two cartridge contacts 60 and the at least two receptacle contacts 62 can be configured to electrically connect in either of at least two orientations. In other words, one or more circuits necessary for operation of the vaporizer 10 can be completed by insertion of the vaporizer cartridge 52 in the cartridge receptacle 54 in a first rotational orientation (around an axis along which the end of the vaporizer cartridge 52 having the cartridge is inserted into the cartridge receptacle 54 of the vaporizer body 50) such that a first cartridge contact of the at least two cartridge contacts 60 is electrically connected to a first receptacle contact of the at least two receptacle contacts 62 and a second cartridge contact of the at least two cartridge contacts 60 is electrically connected to a second receptacle contact of the at least two receptacle contacts 62. Furthermore, the one or more circuits necessary for operation of the vaporizer 10 can be completed by insertion of the vaporizer cartridge 52 in the cartridge receptacle 54 in a second rotational orientation such that the first cartridge contact of the at least two cartridge contacts 60 is electrically connected to the second receptacle contact of the at least two receptacle contacts 62 and the second cartridge contact of the at least two cartridge contacts 60 is electrically connected to the first receptacle contact of the at least two receptacle contacts 62. This feature of the vaporizer cartridge 52 being reversibly insertable into the cartridge receptacle 54 of the vaporizer body 50 is described further below.

In one example of an attachment structure for coupling the vaporizer cartridge 52 to the vaporizer body 50, the vaporizer body 50 includes a detent (e.g., a dimple, protrusion, etc.) protruding inwardly from an inner surface the cartridge receptacle 54. One or more exterior surfaces of the vaporizer cartridge 52 can include corresponding recesses (not shown in FIG. 3) that can fit and/or otherwise snap over such detents when an end of the vaporizer cartridge 52 is inserted into the cartridge receptacle 54 on the vaporizer body 50. When the vaporizer cartridge 52 and the vaporizer body 50 are coupled (e.g., by insertion of an end of the vaporizer cartridge 52 into the cartridge receptacle 54 of the vaporizer body 50), the detent of the vaporizer body 50 may fit within and/or otherwise be held within the recesses of the vaporizer cartridge 52 to hold the vaporizer cartridge 52 in place when assembled. Such a detent-recess assembly can provide enough support to hold the vaporizer cartridge 52 in place to ensure good contact between the at least two cartridge contacts 60 and the at least two receptacle contacts 62, while allowing release of the vaporizer cartridge 52 from the vaporizer body 50 when a user pulls with reasonable force on the vaporizer cartridge 52 to disengage the vaporizer cartridge 52 from the cartridge receptacle 54.

Further to the discussion above about the electrical connections between the vaporizer cartridge 52 and the vaporizer body 60 being reversible such that at least two rotational orientations of the vaporizer cartridge 52 in the cartridge receptacle 54 are possible, in some vaporizers the shape of the vaporizer cartridge 52, or at least a shape of the end of the vaporizer cartridge 52 that is configured for insertion into the cartridge receptacle 54 may have rotational symmetry of at least order two. In other words, the vaporizer cartridge 52 or at least the insertable end of the vaporizer cartridge 52, may be symmetric upon a rotation of 180° around an axis along which the vaporizer cartridge 52 is inserted into the cartridge receptacle 54. In such a configuration, the circuitry of the vaporizer 10 may support identical operation regardless of which symmetrical orientation of the vaporizer cartridge 52 occurs.

In some examples, the vaporizer cartridge 52, or at least an end of the vaporizer cartridge 52 configured for insertion in the cartridge receptacle 54, may have a non-circular cross section transverse to the axis along which the vaporizer cartridge 52 is inserted into the cartridge receptacle 54. For example, the non-circular cross section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximately having a shape, indicates that a basic likeness to the described shape is apparent, but that sides of the shape in question need not be completely linear and vertices need not be completely sharp. Rounding of both or either of edges or vertices of the cross-sectional shape is contemplated in the description of any non-circular cross section referred to herein.

The at least two cartridge contacts 60 and the at least two receptacle contacts 62 can take various forms. For example, one or both sets of contacts 60, 62 may include conductive pins, tabs, posts, receiving holes for pins or posts, or the like. Some types of contacts 60, 62 may include springs or other urging features to cause better physical and electrical contact between the contacts 60, 62 on the vaporizer cartridge 52 and the vaporizer body 50. The electrical contacts 60, 62 may optionally be gold-plated, and/or can include other materials.

In some implementations of the current subject matter, a central digital device (e.g., the central device 102 or the digital device 202), such as a smartphone, is configured to communicate with a BLE-enabled peripheral device (e.g., the peripheral device 104 or a vaporizer such as the vaporizer 204) over a BLE connection. The digital device can be implemented, e.g., as a computing apparatus of FIG. 8, or it can have another configuration that allows it to communicate wirelessly with a peripheral device. The BLE-enabled peripheral device can be a vaporizer such as, for example, the vaporizer 204 (FIG. 2), an example of which is shown in the form of the vaporizer 10 in FIG. 3.

Figure 5A:
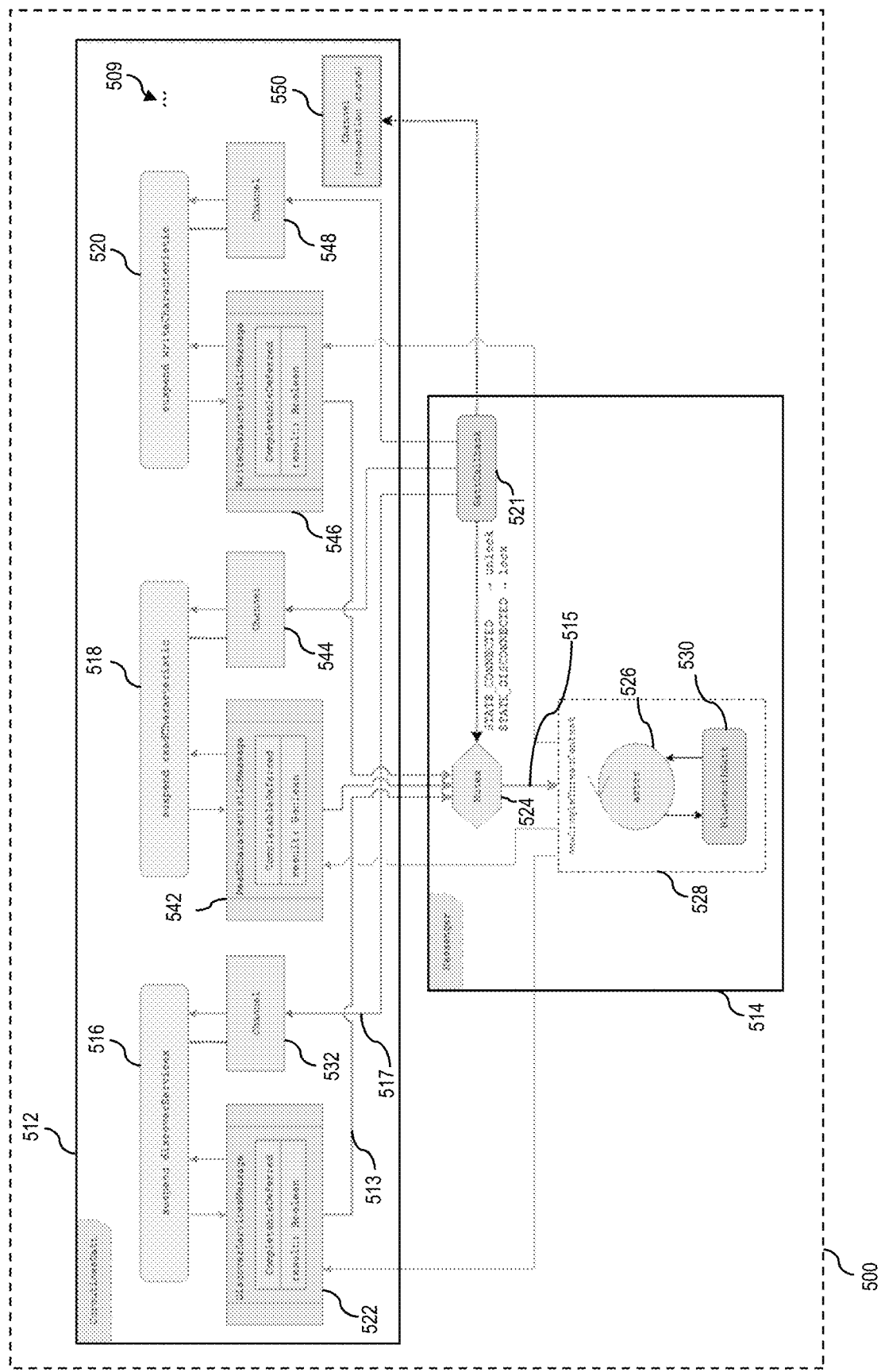
FIG. 5A is a schematic diagram illustrating an Android BLE-specific Application Programming Interface (API) implemented in accordance with some example implementations.

In some implementations of the current subject matter, the central digital device establishes a BLE connection to the BLE-enabled peripheral device to communicate with the BLE-enabled peripheral device. Once the BLE connection is established, at least one processor of the central digital device sends a request to the BLE-enabled peripheral device for access to BLE data pertaining to BLE services at the BLE-enabled peripheral device. The request can be sent as part of an operation defined by a certain suspending module. The at least one processor determines whether a locking module is locked, and the determining includes accessing the locking module. The locking module is locked while the BLE connection is not available (FIG. 6) or while a previous BLE operation is in progress (FIG. 5A). If it is determined that the locking module is locked, the at least one processor can suspend performance of the operation comprising the request, which is done without blocking a current thread. The at least one processor can further determine that the locking module has become unlocked and, in response, it can allow resumption of the performance of the operation. When the operation is resumed, the operation can proceed to completion such that a result of the performance of the operation, including a response to the request, can be received.

In the described implementations of the current subject matter, processing defined by a suspending module that defines an operation is suspended until it is determined that the BLE connection is maintained (FIG. 6) or until the previous BLE operation is complete (FIG. 5A). Performance of the operation is suspended without blocking a current thread until it is determined that the BLE connection is maintained or restored. Such processing is based on sequential suspension of coroutines. In some implementations, Kotlin®-based coroutines are utilized.

Figure 4:
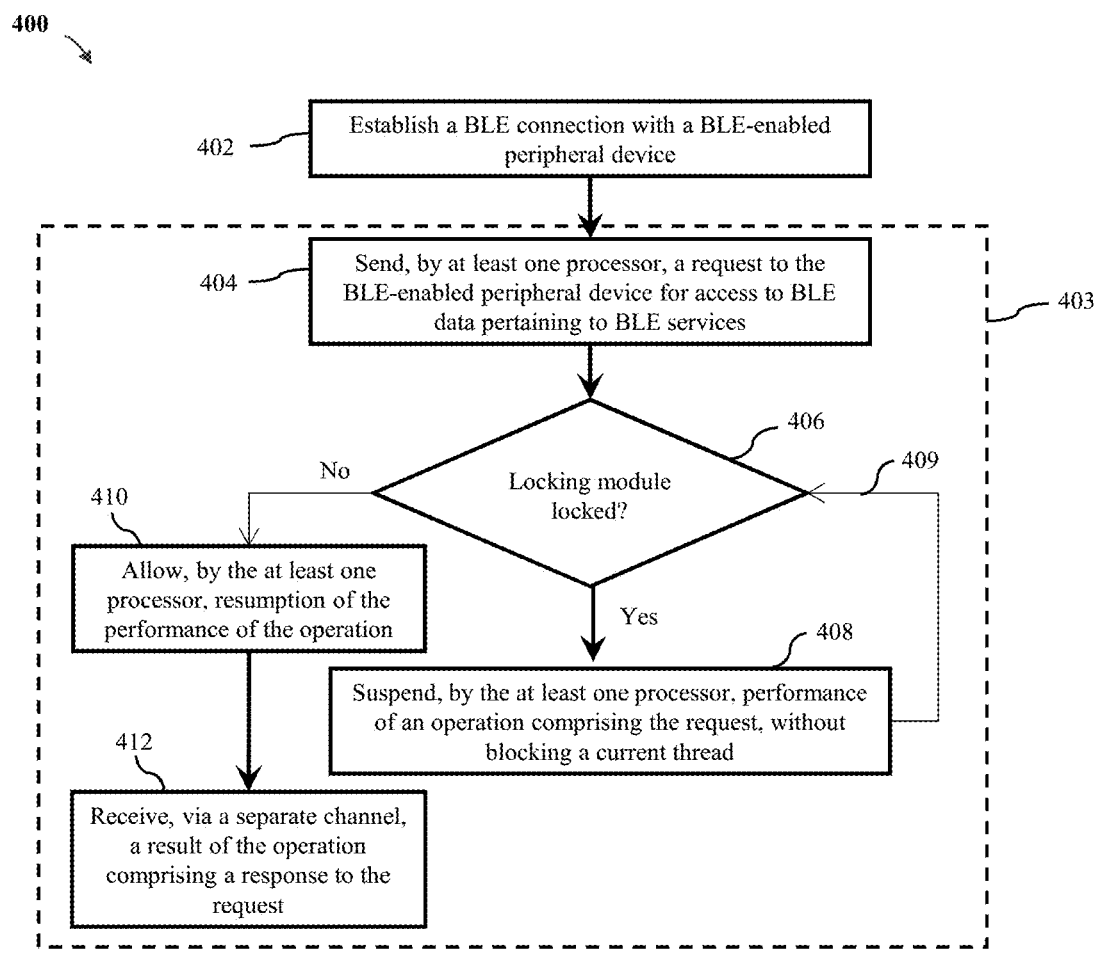
FIG. 4 is a flowchart illustrating a method of communication with a BLE-enabled peripheral device, in accordance with some example implementations.

FIG. 4 shows steps of an example of a process 400 of communication with the BLE-enabled peripheral device, such as, for example, the process 400 of communication between the central device and the peripheral device. One or more portions of the process 400 can be implemented using at least one processor of the central digital device. An example of an Android BLE API 500, executed on the central device and implementing the process 400 of FIG. 4, is shown in FIG. 5A.

The process 400 can begin at block 402 at which a BLE connection between the BLE-enabled central device and the BLE-enabled peripheral device is established. The BLE connection is established when the peripheral device is within the range of the central device. The central device and the peripheral device may pair. Once the BLE connection between the devices is established, the central device may communicate with the peripheral device. The BLE API 500 of FIG. 5A, implemented in accordance with the current subject matter, is stored and executed on the central device. The BLE API 500 allows applications to access BLE services of the peripheral device. As shown in FIG. 5A, the BLE API 500 includes a BLE-specific library (e.g., the BLE-specific library 112 of FIG. 1A), shown by way of example as a CoroutinesGatt module 512, and a messenger module 514. The BLE-specific library may be referred to by way of example as an Android BLE (ABLE) library.

The CoroutinesGatt module 512 includes suspension or suspending modules, non-limiting examples of which include a discover services module 516 (shown by way of example as "suspend discoverServices"), a read characteristic module 518 (shown by way of example as "suspend readCharacteristic"), a write characteristic module 520 (shown by way of example as "suspend writeCharacteristic"), and any other suspending modules (schematically shown by an element 509 in FIG. 5A). The suspending modules 516, 518, 520 are implemented based on Kotlin® coroutines (e.g., kotlinx.coroutines), in the manner that imitates sequential behavior and implements concurrency explicitly. Operations defined by the suspending modules 509, 516, 518, 520 may be executed in any suitable order, although the discover services module 516 can be executed before characteristics are read from or written into BLE services data, or before other BLE-related operations are performed.

Referring back to FIG. 4, at block 403, an operation including a request to the peripheral device to access data pertaining to BLE-related services at the peripheral device can be performed. The processing at block 403 may include, as shown at block 404 of FIG. 4, sending a request to the BLE-enabled peripheral device for access to BLE data pertaining to BLE services. With reference to FIG. 5A, the performance of the sending at block 404 can include initiating execution of the operation defined by the suspending modules 509, 516, 518, 520, e.g., the discover services module 516, and generating a corresponding message to a locking module 524 (e.g., "Mutex" which can be implemented in Kotlin®) of the messenger module 514. At block 406 of FIG. 4, it may be determined whether the locking module 524 is locked. For example, with reference to FIG. 5A, as shown for the discover services module 516, a discover services message or request ("DiscoverServicesMessage") 522 is generated and provided to the locking module 524, as shown in FIG. 5A.

The locking module 524 is configured to provide blocking of processing, or performance, of operations defined by the suspending functions. If the BLE connection with the peripheral device has been interrupted or lost ("STATE_DISCONNECTED"), the locking module 524 is locked such that the suspending function is prevented from being executed to completion and continues being suspended. If the BLE connection with the peripheral device is maintained or restored ("STATE_CONNECTED"), the locking module 524 is unlocked and the suspension of execution of the suspending function resumes. A result of the execution of the suspending function is ultimately received, in the form of an event placed on a channel. The states of the connection, connected ("STATE_CONNECTED") or disconnected ("STATE_DISCONNECTED"), are made available by a connection discovery module 521 ("GattCallback"). The GattCallback module 521 is configured to receive a connection state.

The locking module 524 suspends operations when it is in a "non-ready" state, which may also be referred to as a "non-connected" state ("STATE_DISCONNECTED"). Upon being unlocked, the locking module 524 continues execution of suspended operations (e.g., operations defined by the suspending modules 509, 516, 518, 520 in FIG. 5A), in the order in which these operations were originally requested. A single thread newSingleThreadContext 528 ensures that the operations are executed in their requested order. It should be noted, however, that a service discovery operation (e.g., an operation defined in the discover services module 516) is typically performed before other operations (e.g., read characteristic operations defined by the read characteristic module 518 or write characteristic operations defined by the write characteristic module 520).

Continuing with the example of the discover services module 516, the discover services message 522 is passed (513) to the locking module 524. If the locking module 524 is locked, execution of a discover services operation defined by the discover services module 516 is suspended until the locking module 524 is unlocked. If the locking module 524 is not locked, the discover services operation is allowed to be performed.

In the scenario in which the locking module 524 was initially locked, the discover services operation resumes only once the locking module 524 becomes unlocked. The discover services message 522 is then passed (515) to an actor or actor module 526 operating in conjunction with the locking module 524. The actor module 526, which is a type of a coroutine configured to receive messages and expose a channel for sending messages, is used to provide a way for sequential execution of BLE operations, such as, in this example, the discover services operation defined by the discover services module 516. The actor module 526, which is operated in a context of the single thread 528 ("newSingleThreadContext"), calls an appropriate BluetoothGatt function of BLE stack 530 ("BluetoothGatt") to perform the discover services operation. The BLE stack 530 (e.g., a BLE stack of the BLE module 107 of FIG. 1A) is configured to communicate with the BLE layer of the peripheral device (e.g., a BLE layer of the BLE module 109 of the peripheral device 104 of FIGS. 1A and 1B) which may be a vaporizer (e.g., the vaporizer 204) in some embodiments. The actor module 526, which can be "shared" by other coroutines-based operations, is configured to process one message at a time, and it determines timing of message calls such that a likelihood of errors is reduced.

A result of the discover services operation is provided (517) to the discover services module 516 by the connection discovery module 521, over a dedicated channel 532, which is a channel dedicated to this result and that may be referred to as a broadcast channel. In the example of the discover services module 516, the result includes information of the BLE services discovered at the peripheral device. The result can be in the form of a list of such remote services, including characteristics and descriptors at the peripheral device.

As shown in FIG. 5A, the discover services message ("DiscoverServicesMessage") 522 generated upon initiation of the discover services module 516, has "CompletableDeferred" and "result: Boolean" features. The result of the BluetoothGatt call is received via CompletableDeferred, and the final result of the BluetoothGatt call is returned via GattCallback 521 and is passed to the discover services module 516 via the dedicated channel 532. In this example, CompletableDeferred denotes an interface in Kotlin® that utilizes completion functions configured to return deferred values depending on whether the deferred value is active, completed, or canceled. CompletableDeferred is passed to the messenger module 514 as part of a request 542. Functions of the CompletableDeferred interface are thread-safe and can be safely invoked from concurrent coroutines.

The "result: Boolean" feature provides an indication indicating a result of a request (e.g., the request 522). For example, the indication may be a "fault" if BLE features are not available on the central device. In some embodiments, the BLE operation process includes two phases: (1) requesting that the Android system execute a BLE operation (via BluetoothGatt 530), and (2) receiving a result of the execution of the BLE operation (via BluetoothGattCallback 521). The phase (1) can fail if the central device (e.g., an Android smartphone) does not have BLE capabilities or if BLE is disabled. The phase (2) can fail if the central device is unable to communicate with the peripheral device. In such cases, the Android system indicates that the BLE operation could not complete, e.g., if the peripheral device is out-of-range.

Referring back to FIG. 4, if it is determined, at decision block 406, that the locking module is locked, the process 400 can follow to block 408 where the process 400 performs suspending, by the at least one processor in response to the determining that the locking module is locked, performance of the operation comprising the request, without blocking a current thread. The process 400 can continue determining whether the locking module remains locked, such that the process 400 returns (409) from block 408 to decision block 406, as shown in FIG. 4. Alternatively, if it is determined at decision block 406 that the locking module is not locked, the process 400 can branch to block 410 where resumption of the performance of the operation is allowed by the at least one processor.

At block 412 of FIG. 4, a result of the performed operation comprising a response to the request can be received via a separate channel. The separate channel can be a broadcast channel dedicated to convey a response to a connection request. The coroutines used in the described embodiments allow implementing synchronous processing in a serial manner, such that BLE requests are processed in a serial manner.

In implementations of the current subject matter, various operations can be defined by suspending functions provided as part of an API for Android BLE communication. The Android BLE API allows applications to access BLE functionality of a device. In some embodiments, the suspending functions can be functions that receive a result of a remote characteristic notification, a result of a characteristic read operation, a result of a characteristic write operation, an indication indicating that a GATT client has connected/disconnected to/from a remote GATT server, a result of a descriptor read operation, an indication indicating that a maximum transmission unit (MTU) for a certain device connection has changed, and/or any other types of functions. The suspending functions are implemented in conjunction with coroutines, and suspending functions may be used inside coroutines.

FIG. 5A illustrates that the CoroutinesGatt module 512 includes the discover services module 516, the read characteristic module 518 ("suspend readCharacteristic"), and the write characteristic module 520 ("suspend writeCharacteristic"). The CoroutinesGatt module 512 can include any other suspending modules 509. The read characteristic module 518 and the write characteristic module 520 are configured to perform respective operations in a manner similar to performance of operations defined by the discover services module 516. Thus, the read characteristic module 518 is configured to generate a ReadCharacteristicMessage message or request 542 that conveys a request to read a characteristic from BLE services of the BLE-enabled peripheral device to the messenger module 514, and to receive a response to the request 542 from the connection discovery module 521 via a dedicated channel 544. The response to the request 542 may be a characteristic obtained from the BLE services of the BLE-enabled peripheral device.

Similarly, the write characteristic module 520 is configured to generate a WriteCharacteristicMessage message or request 546 that conveys a request to write a characteristic to the BLE services to the messenger module 514, and to receive a response to the request 546 from the connection discovery module 521 via a dedicated channel 548. The response to the request 546 may be an indication (e.g., a value) indicating that a characteristic was successfully written into a memory of the BLE-enabled peripheral device having the BLE services. The dedicated channels 532, 544, 548, as well as dedicated channels of any other suspending modules 509, are configured to convey a response to a request transmitted to the peripheral device when a respective suspended operation resumes and proceeds to completion.

FIG. 5A also illustrates that the CoroutinesGatt module 512 further includes a connection state channel 550 that is a dedicated channel configured to receive an indication of a connection state from the connection discovery module 521. The connection state indication can be utilized for various purposes that improve the CoroutinesGatt module 512.

Suspension functions in the form of an API for Android BLE framework, provided in accordance with some implementations of the current subject matter, allow for this functionality to be easily pluggable/extendable. Thus, embodiments in accordance with some implementations of the current subject matter provide the ability to add an intermediate layer that can improve the communication reliability by providing retry and connection handling. Accordingly, in some implementations of the current subject matter, a connector layer or connector module 560 is provided that allows retrying establishing a lost connection until the connection is successfully established or until a predetermined amount of time has passed, as shown schematically in FIG. 6. The connector module 560 handles complexities of a BLE state machine. In this way, the CoroutinesGatt module 512 (a core of the BLE-specific library provided in accordance with the current subject matter) can perform operations (e.g., I/O or other operations) without being affected by connection complexities. The connector module 560 is configured to establish an initial connection flow and to retry establishing lost connections until a configurable timeout event occurs. The connector module 560 operates by suspending input/output (I/O) or other requested operations such that upon successful completion of a setup or reconnection, the operations resume.

Thus, in some implementations, the connector module 560 incorporates I/O retry functionality and on-demand connection establishment. Performance of I/O operations (e.g., an operation of writing a characteristic to BLE services, reading a characteristic from BLE services, etc.) may involve attempting an operation, checking whether a connection is established and requesting a connection if it is not established.

Figure 6:
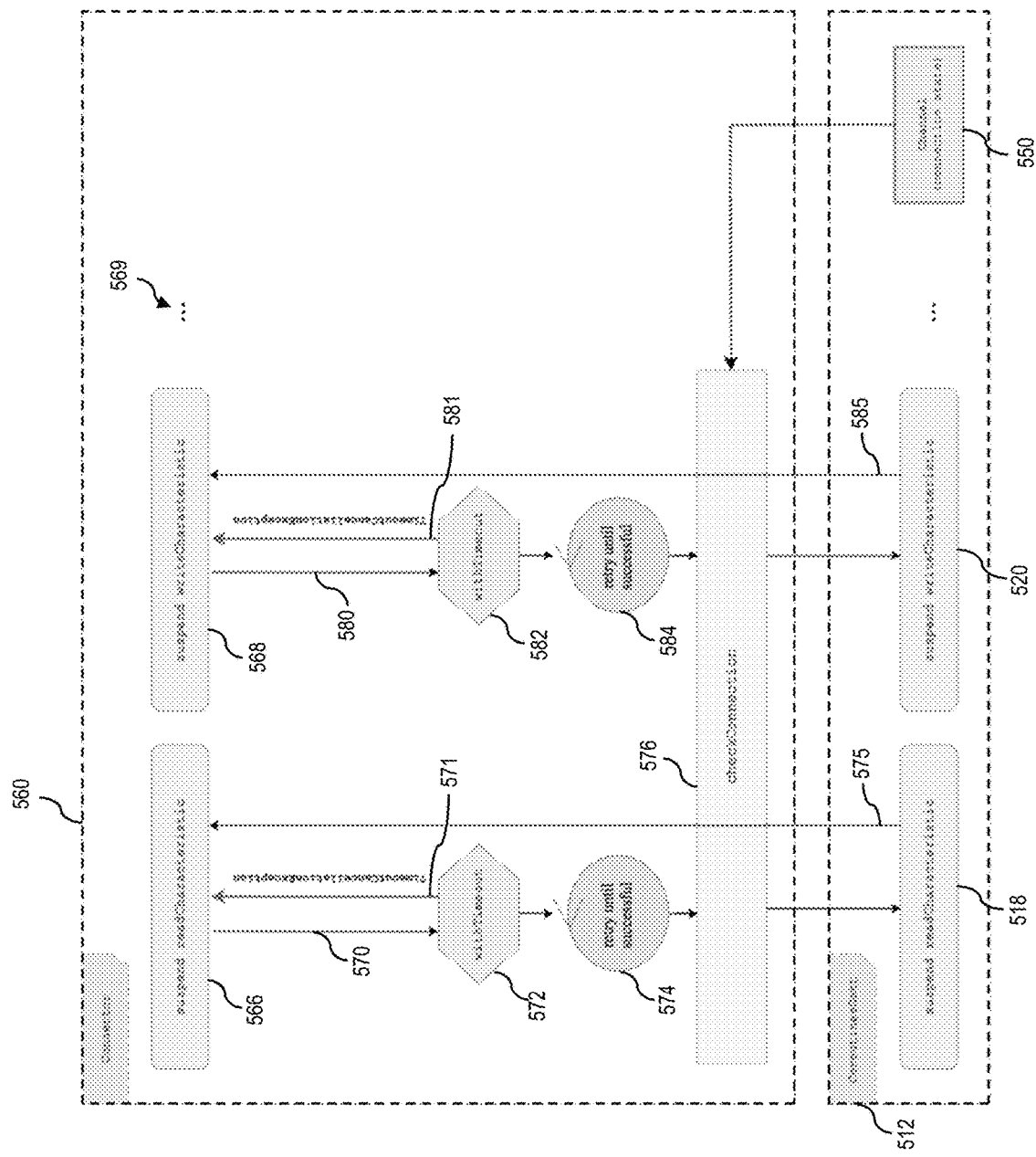
FIG. 6 is a schematic diagram illustrating a connector module assisting operation of the Android BLE-specific API of FIG. 5A, in accordance with some example implementations.

As shown in FIG. 6, the connector module 560 includes a read characteristic module 566 ("suspend readCharacteristic"), a write characteristic module 568 ("suspend writeCharacteristic"), and any other suspending module(s) 569. The read and write characteristic modules 566, 568 and other module(s) 569 of the connector module 560 are not the same modules as the read and write characteristic modules 516, 518 and any other module(s) 509 of the CoroutinesGatt module 512.

FIG. 6 illustrates that read and write characteristic operations suspend while the connector module handles BLE state machine. Once connection and setup operations are performed, the connector module 560 calls into the core module 512 of the BLE library.

The read characteristic module 566 provides a read request 570 to read a characteristic from the BLE services of a peripheral device, and the read characteristic operation defined by the read characteristic module 566 is suspended while the connector module 560 attempts to reestablish a BLE connection with the peripheral device. As shown schematically in FIG. 6, the read request 570 is processed in conjunction with an indication of a timeout ("withTimeout") 572 such that an attempt to reestablish a lost or interrupted BLE connection is repeated (block 574) until a certain predetermined amount of time has passed. When a timeout event occurs, a read timeout message 571 is generated (shown as "TimeoutCancellationException"), indicating that an exception is thrown. A check connection module 576 ("checkConnection") is configured to suspend the read characteristic operation defined by the read characteristic module 566 until a BLE connection is established. Once the BLE connection is established, the read request 570 is passed to the read characteristic module 518 of the CoroutinesGatt module 512. If the BLE connection becomes unavailable when the operation defined by the read characteristic module 518 is performed, the processing can return to the read characteristic module 566 of the connector module 560, as shown by an arrow 575 in FIG. 6. In this way, the connector module 560 will assist the CoroutinesGatt module 512 with reestablishing the lost or interrupted BLE connection, while handling BLE state machine complexities. The arrow 575 indicates that the result returned by the read characteristic module 518 is propagated back to the read characteristic module 566 when a timeout, while trying to connect, did not occur.

FIG. 6 also illustrates that the write characteristic module 568 provides a write request 580 to write a characteristic to the BLE services of a peripheral device. Similar to the read request 570, the write request 580 is suspended while attempts to reestablish a lost or interrupted BLE connection are repeated (as shown at block 584) until a predetermined timeout event 582 occurs. A write timeout message 581 is generated (shown as "TimeoutCancellationException") to indicate the timeout to the write characteristic module 568. The write request 580 is resumed upon successful completion of the BLE connection reestablishment process. Once the BLE connection is reestablished, the write request 580 is passed to the write characteristic module 520 of the CoroutinesGatt module 512. As shown by an arrow 585 in FIG. 6, if the BLE connection becomes unavailable when the operation defined by the write characteristic module 520 is performed, the processing can return to the write characteristic module 568 of the connector module 560, which will attempt to reestablish the BLE connection.

Figure 5B:
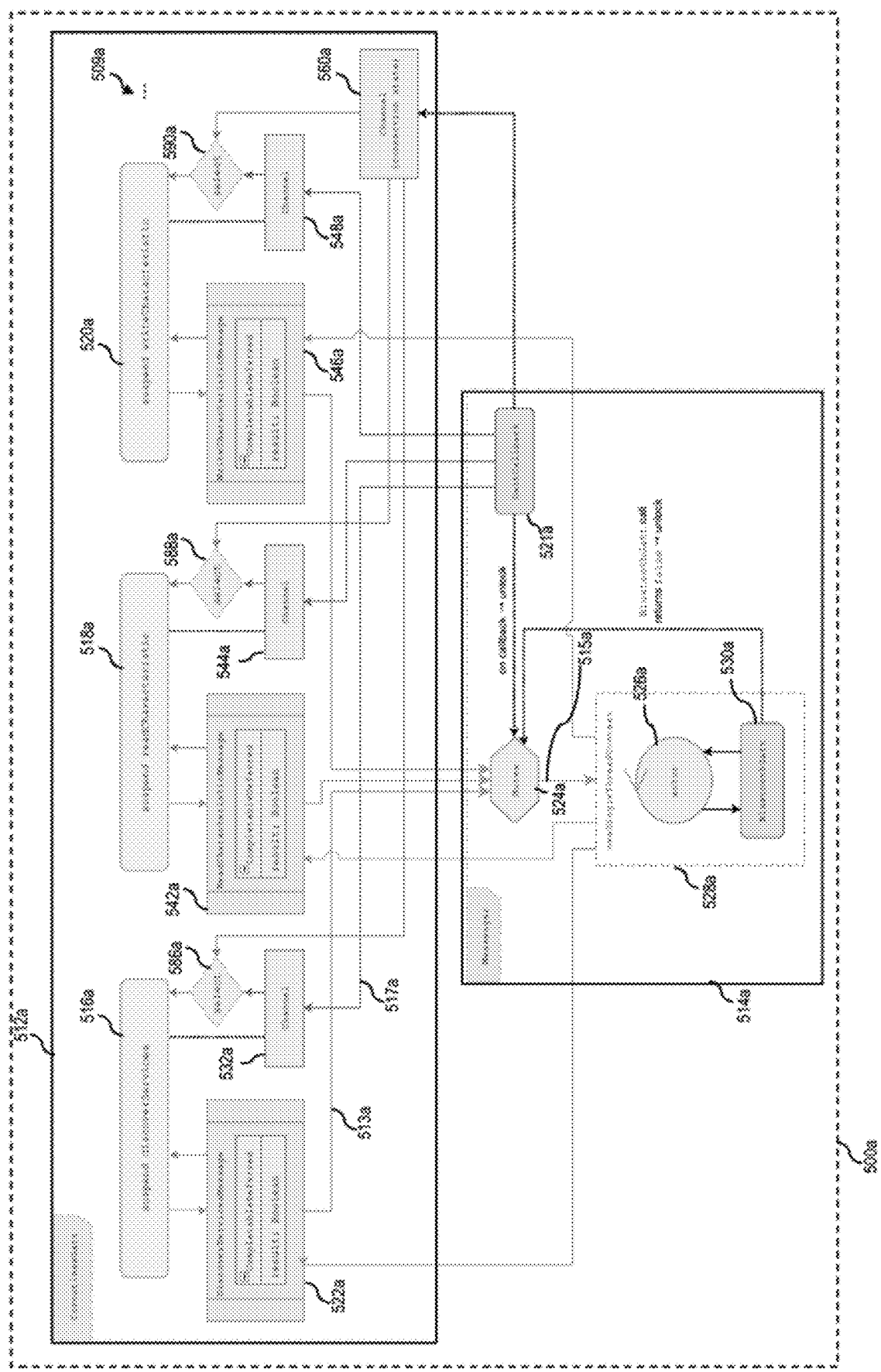
FIG. 5B is a schematic diagram illustrating another Android BLE-specific API implemented in accordance with some example implementations.

Another example of an Android BLE API 500a, executed on the central device and implementing the process 400 of FIG. 4, is shown in FIG. 5B. The API 500a of FIG. 5B is similar to the API 500 of FIG. 5A with similar elements in FIGS. 5A and 5B having similar names and similar reference numbers with reference numbers in FIG. 5B having an "a" suffix. Accordingly, the description of elements herein with respect to FIG. 5A also applies to similarly named and numbered elements of FIG. 5B except for variations as illustrated and as discussed below. For example, the connector module 560 of FIG. 5A as described with respect to FIG. 6 similarly applies to the connector module 560a of FIG. 5B.

In the example of FIG. 5A, the locking module 524 is configured to provide blocking of processing, or performance, of operations defined by the suspending functions as driven by the GattCallback module 521, namely when the BLE connection is disconnected (e.g., lost or interrupted) as communicated to the locking module 524 from the GattCallback module 521 (e.g., "STATE_DISCONNECTED" communicated to the locking module 524). The locking module 524 unlocks when the connection is reestablished as communicated to the locking module 524 from the GattCallback module 521 (e.g., "STATE_CONNECTED" communicated to the locking module 524). In the example of FIG. 5B, the locking module 524a is not locked and unlocked in response to connection state, e.g., is not locked in response to receipt of a disconnected state from the GattCallback module 521a and is not unlocked in response to receipt of a connected state from the GattCallback module 521a. Suspension still occurs for CoroutinesGatt 512a module functions (e.g., discoverServices, readCharacteristic, etc.) via the locking module 524a to enforce serial execution of requests, as shown by the BLE stack 530a communicating to the locking module 524a if a request failed ("BluetoothGatt call returns false"), thereby triggering unlock. However, the suspension may be interrupted and an exception propagated upon a disconnected state. The exception propagation is shown in FIG. 5B by the GattCallback module 521a communicating a connection state exception to the connector module 560a, which propagates the connection state exception to the suspending modules 516a, 518a, 520a via select functions 586a, 588a, 590a of the CoroutinesGatt module 512a for the respective suspending modules 516a, 518a, 520a. Communication would similarly occur via a select function for each additional suspending module 509a. The select functions 586a, 588a, 590a are thus used to simultaneously monitor for response message and connection state.

Figure 5C:
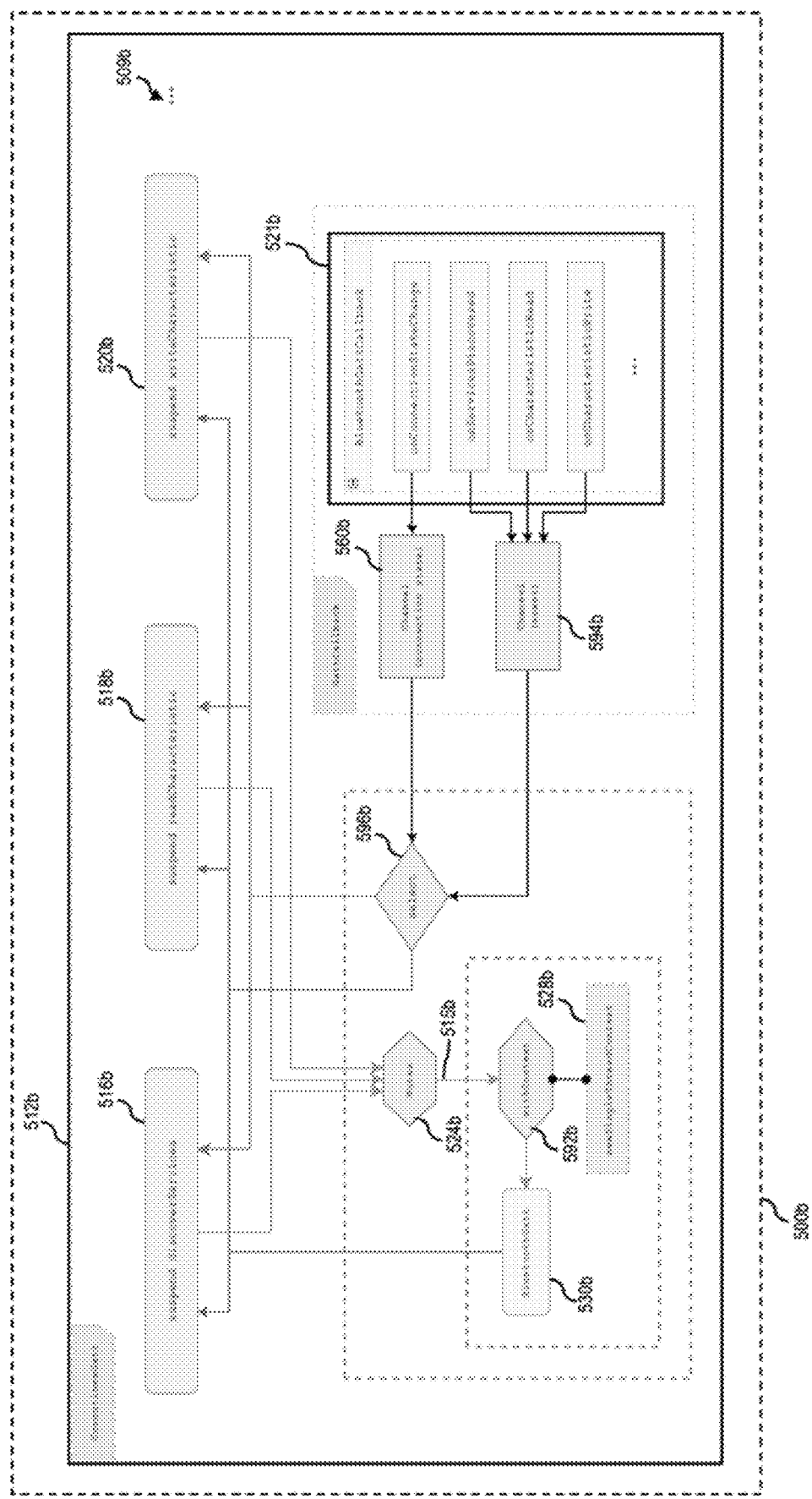
FIG. 5C is a schematic diagram illustrating yet another Android BLE-specific API implemented in accordance with some example implementations.

Another example of an Android BLE API 500b, executed on the central device and implementing the process 400 of FIG. 4, is shown in FIG. 5C. The API 500b of FIG. 5C is similar to the API 500 of FIG. 5A with similar elements in FIGS. 5A and 5C having similar names and similar reference numbers with reference numbers in FIG. 5C having a "b" suffix. Accordingly, the description of elements herein with respect to FIG. 5A also applies to similarly named and numbered elements of FIG. 5C except for variations as illustrated and as discussed below. For example, the connector module 560 of FIG. 5A as described with respect to FIG. 6 similarly applies to the connector module 560b of FIG. 5C.

In the example of FIG. 5B, the locking module 524a is explicitly managed. The locking module 524a is unlocked using the messenger module 514a, e.g., the locking module 524a is locked in response to the actor module 526a receiving a message and is unlocked if the BLE stack 530a call fails in the actor module 526a or when a response is received in the GattCallback module 521a. In general, the messenger module 514a processes messages to determine which BluetoothGatt function 530a to call within the actor module 526a. The actor module 526a may thereby facilitate management of requests and execution of the requests in order on a dedicated thread (the single thread newSingleThreadContext 528). In the example of FIG. 5C, the locking module 524b is implicitly managed. In general, the locking module 524b is locked in response to the discover services module 516b being called and is implicitly unlocked when the function completes, either by successful return or due to raising an exception. A context module 592b ("withContext") of FIG. 5C replaces the messenger module 514a of FIG. 5B. The context module 592b calls the BluetoothGatt functions 530b, manages requests, and execute the requests in order on a dedicated thread (the single thread newSingleThreadContext 528b). Rather than the GattCallback module 521a routing each BluetoothGatt function to the individual channels 532a, 544a, 548a as in the API 500a of FIG. 5B, in the API 500b of FIG. 5C the GattCallback module 521b routes each BluetoothGatt function to a single channel 594b for selection 596 to the suspending modules 509b, 516b, 518b, 520b. The actor module 526a, the discover services message or request 522a, the ReadCharacteristicMessage message or request 542a, and the WriteCharacteristicMessage message or request 546a, and their accordant complexity, are thus not needed in the API 500b of FIG. 5C.

Figure 7:
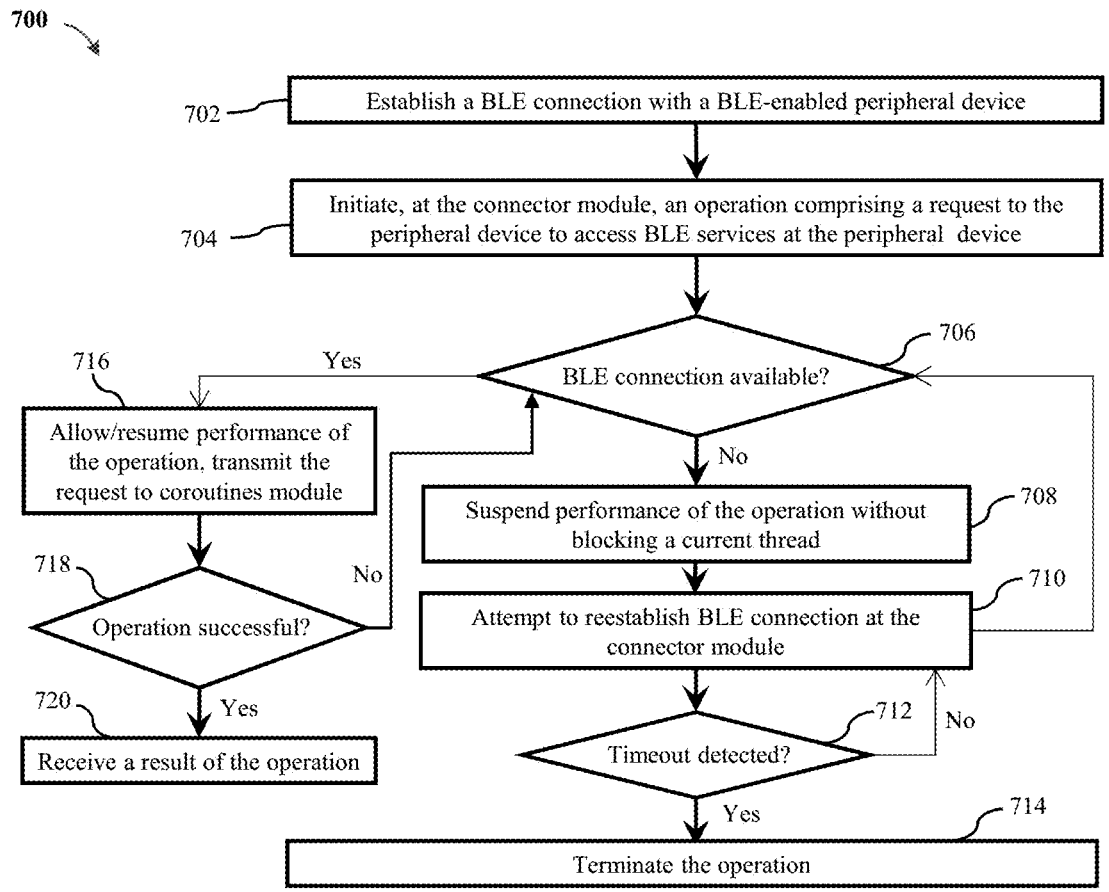
FIG. 7 is a flowchart illustrating a method of communication with a BLE-enabled peripheral device in which a connector module assists with reestablishment of a lost connection, in accordance with some example implementations.

FIG. 7 illustrates an example of a process 700 of using the connector module 560 of FIG. 6 (or other connector module as described herein such as the connector module 560a and connector module 560b) to assist in maintaining a BLE connection during communication with a peripheral device (e.g., the peripheral device 104 or a vaporizer such as the vaporizer 204). The process 700 can be executed by at least one processor of a central device (e.g., the central device 102 or the digital device 202) through which the peripheral device can be controlled.

As shown in FIG. 7, at block 702, a BLE connection with a BLE-enabled peripheral device is established. At block 704, at the connector module 560, an operation including a request to the peripheral device to access BLE services at the peripheral device may be initiated. For example, the read characteristic module 566 may be executed to provide the read request 570 to read a characteristic from the BLE services of the peripheral device, as shown in FIG. 6. At decision block 706, it may be determined whether the BLE connection is available. If it is determined that the BLE connection is not available, indicating that the BLE connection has been lost or interrupted, the process 700 may follow to block 708 at which performance of the operation defined by the read characteristic module 566 can be suspended, as described herein, without blocking a current thread.

At block 710, the process 700 attempts to reestablish the BLE connection at the connector module 560 to reconnect the central device with the peripheral device. As discussed above, the reconnecting process may be performed in conjunction with a timeout, such that the connector module 560 attempts to reestablish the BLE connection until a timeout occurs. Accordingly, at decision block 712, it may be determined whether a timeout is detected, meaning that a predetermined amount of time has passed without the BLE connection being reestablished. If this is the case, the process 700 follows to block 714 where the exception can be thrown and the operation may be terminated. In some embodiments, an indication that the connection is considered lost or interrupted and/or of the inability to restore the connection may be provided to a user. Alternatively, if it is determined at decision block 712 that the timeout is not detected (meaning that the predetermined amount of time has not passed), the process 700 can return to block 710 where the process 700 continues attempting to reestablish the lost or interrupted BLE connection.

If it is determined, at decision block 706, that the BLE connection is available (which may indicate that the BLE connection has been reestablished), the process 700 branches to block 716 where the performance of the operation is resumed from suspension and the request is passed to a coroutines module, such as the CoroutinesGatt module 512 of FIG. 5A. Thus, continuing with the example of the read characteristic operation, the read request may be passed to the read characteristic module 518 of the CoroutinesGatt module 512. The process 700 may then follow to decision block 718 where the process 700 determines whether the BLE operation has completed successfully. If the BLE operation is not successful, the process 700 returns to decision block 706 where the process 700 determines whether the BLE connection is available. Alternatively, if it is determined that the BLE operation has completed successfully, the process 700 may follow to block 720 where a result of the operation, such as, e.g., the read characteristic operation, may be received, which may be performed as shown in FIG. 6.

It should be appreciated that FIG. 7 is described herein in conjunction with a read characteristic operation by way of example only, as any other operation requesting access to BLE services of a peripheral device may be performed using the described subject matter, as shown in FIG. 7.

Processing in accordance with implementations of the current subject matter is performed using a computing apparatus configured to store in its memory various modules illustrated and/or described herein, such as, e.g., the BLE-specific library 112 including the coroutines module 114 and the application 108 (FIGS. 1A, 4-7). The BLE-specific library 112 is generated in accordance with the implementations of the current subject matter and includes features that improve Android BLE framework.

FIG. 8 illustrates an example computing apparatus 600, which may be used to implement one or more of the described features and/or components, in accordance with some example implementations. For example, at least a portion of the computing apparatus 600 may be used to implement at least a portion of the central device 102 (FIG. 1A), the central device 202 (FIG. 2), the peripheral device 104 (FIGS. 1A and 1B), the vaporizer 204 (FIG. 2), and/or the like. The components of the computing apparatus 600 can be implemented in addition to or alternatively from any of the components of the central devices and/or the peripheral devices illustrated and/or described.

The computing apparatus 600 may perform one or more of the processes described herein. For example, the computing apparatus may be used to execute the application 108 (FIG. 1) utilizing the BLE-specific library 112, which may be referred to as ABLE in some embodiments. The computing apparatus 600, when used to implement at least a portion of the central device 102 or 202 (FIGS. 1A, 2, 5, and 6), may execute the Android operating system. As another example, additionally, in some implementations, the computing apparatus 600 may be used to execute an application providing for user control of a peripheral device, which may be a vaporizer. In this way, the computing apparatus 600 may be used to execute an application providing for user control of a vaporizer in communication with the computing apparatus 600 and/or to provide an interface for the user to engage and interact with functions related to the vaporizer, in accordance with some example implementations.

As illustrated, the computing apparatus 600 may include one or more processors such as processor 610 to execute instructions that may implement operations consistent with those described herein. The computing apparatus 600 may include a memory 620 to store executable instructions and/or information. The memory 620 may include solid-state memory, solid-state disk drive(s), magnetic disk drive(s), or any other information storage device(s). The computing apparatus 600 may include at least one network interface 640 to a wired network and/or a wireless network, which may include a network interface to a wireless personal area network employing the BLE framework. In order to effectuate wireless communications, the network interface 640, for example, may utilize one or more antennas, such as antenna 690.

The computing apparatus 600 may include one or more user interfaces, such as user interface 650. The user interface 650 can include hardware or software interfaces, such as a keyboard, mouse, or other interface, some of which may include a touchscreen integrated with a display 630. The display 630 may be used to display information, such as information related to the functions of a vaporizer, provide prompts to a user, receive user input, and/or the like. In various implementations, the user interface 650 can include one or more peripheral devices and/or the user interface 650 may be configured to communicate with these peripheral devices.

In some aspects, the user interface 650 may include one or more sensors and/or may include an interface to one or more sensors, such as those described herein. The operation of these sensor(s) may be controlled, at least in part, by a sensor module 660. The computing apparatus 600 may comprise an I/O filter 670, which can filter information received from the sensor(s) or other user interface(s), received and/or transmitted via the network interface 640, and/or the like. For example, signals detected through the sensor(s) can be passed through the I/O filter 670 for proper signal conditioning, and the filtered data may then be passed to the sensor module 660 and/or the processor 610 for validation and processing (e.g., before transmitting results or an indication via the network interface 640). The computing apparatus 600 may be powered through the use of one or more power sources, such as power source 680. As illustrated, one or more of the components of the computing apparatus 600 may communicate and/or receive power through a system bus 699.

Any of the devices described herein may include a device lock, as mentioned herein. For example, an app (e.g., running on a central device such as central device 102 or 202) and/or a vaporizer (e.g., the vaporizer 204) may authenticate to a central device (e.g., the central device 102 or 202) using encryption, as an anti-counterfeit mechanism. A similar scheme may be used to tie the vaporizer to the central device (e.g., phone, smartwatch, pad, etc.), such that if stolen the central device is disabled to prevent others from using it. In some implementations, the vaporizer may connect periodically using the network interface 640 to the central device to verify and/or authorize use and/or age of the user. In some implementations, a user may connect to the application on the central device or computer and provide authentication to enable operation of the vaporizer. In some aspects, the authentication includes password or PIN entry, a defined gesture (e.g., tap three times, etc.), selection of a confirmation button, a voice authentication, or a biometric authentication (e.g., facial recognition, etc.) inputted into the application using the user interface (e.g., the user interface 650).

In implementations in which the peripheral BLE-enabled device is a vaporizer, the vaporizer may additionally include parental lockout (e.g., child-proofing) which may be implemented in various ways. For example, the vaporizer could be 'locked' for parents who want to make sure their children will not use the device. In some implementations, the vaporizer may include a thumbprint/fingerprint sensor (e.g., as part of the sensor module 660) which enables operation of the vaporizer with a valid thumbprint/fingerprint. The vaporizer may also or instead include other biometric sensors (e.g., as part of the sensor module 660) for authentication purposes. For example, the vaporizer may include sensors capable of iris recognition, face recognition, speech recognition, DNA recognition, or the like. In another example, the vaporizer may require a specific action/gesture to enable operation. The specific action or gesture may include a password or PIN entry, a defined gesture (e.g., tap three times, etc.), a voice authentication, selection of a confirmation button, or a biometric authentication (e.g., facial recognition, etc.). In some aspects, the vaporizer's processor (e.g., processor 610) can receive these inputs from the sensor(s) and/or other component(s) and determine if authentication is successful.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected," "attached," or "coupled" to another feature or element, it can be directly connected, attached, or coupled to the other feature or element or intervening features or elements may be present. In contrast, when a feature or element is referred to as being "directly connected," "directly attached," or "directly coupled" to another feature or element, there are no intervening features or elements present.

Although described or shown with respect to a given example, the features and elements so described or shown can apply to other implementations of the current subject matter. It will also be appreciated by those of skill in the art that references to a structure or feature that is disposed "adjacent" another feature may have portions that overlap or underlie the adjacent feature.

Terminology used herein is for the purpose of describing particular implementations and implementations only and is not intended to be limiting. For example, as used herein, the singular forms "a," "an," and "the" are intended to include the plural forms as well, unless the context clearly indicates otherwise. It will be further understood that the terms "comprises" and/or "comprising," when used in this specification and in the claims, specify the presence of stated features, steps, operations, elements, and/or components, but do not preclude the presence or addition of one or more other features, steps, operations, elements, components, and/or groups thereof.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

Throughout this specification and the claims, which follow, unless the context requires otherwise, the word "comprise," and variations such as "comprises" and "comprising," means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative implementations are described above, any of a number of changes may be made to various implementations without departing from the teachings herein. For example, the order in which various described method steps are performed may often be changed in alternative implementations, and in other alternative implementations, one or more method steps may be skipped altogether. Optional features of various device and system implementations may be included in some implementations and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like The examples and illustrations included herein show, by way of illustration and not of limitation, specific implementations in which the subject matter may be practiced. As mentioned, other implementations may be utilized and derived there from, such that structural and logical substitutions and changes may be made without departing from the scope of this disclosure. Such implementations of the inventive subject matter may be referred to herein individually or collectively by the term "invention" merely for convenience and without intending to voluntarily limit the scope of this application to any single invention or inventive concept, if more than one is, in fact, disclosed. Thus, although specific implementations have been illustrated and described herein, any arrangement calculated to achieve the same purpose may be substituted for the specific implementations shown. This disclosure is intended to cover any and all adaptations or variations of various implementations. Combinations of the above implementations, and other implementations not specifically described herein, will be apparent to those of skill in the art upon reviewing the above description.

We claim:

1. A method of communication with a Bluetooth Low Energy (BLE)-enabled peripheral device, the method comprising:
    establishing a BLE connection with the BLE-enabled peripheral device;
    sending, by at least one processor of a central device, a request to the BLE-enabled peripheral device for access to BLE data pertaining to BLE services at the BLE-enabled peripheral device;
    determining, by the at least one processor, whether a locking module of the central device is locked so as to indicate inaccessibility of the BLE data via the BLE connection, the determining comprising accessing the locking module;
    suspending, by the at least one processor in response to the determining that the locking module is locked, performance of an operation comprising the request;
    determining, by the at least one processor, whether the locking module has become unlocked; and
    allowing, by the at least one processor in response to the determining that the locking module is unlocked, resumption of the performance of the operation comprising the request, the operation enabling access to the BLE data pertaining to the BLE services at the BLE-enabled peripheral device.

2. The method of claim 1, wherein the locking module is locked while the BLE connection becomes unavailable, and the locking module becomes unlocked once the unavailable BLE connection becomes available.

3. The method of claim 1, wherein the locking module becomes unlocked once the operation has been performed.

4. The method of claim 1, wherein the request comprises a request to discover the BLE services available at the BLE-enabled peripheral device.

5. The method of claim 1, wherein the request comprises a request to read data from the BLE data that is stored in a memory of the BLE-enabled peripheral device.

6. The method of claim 5, wherein the request to read the data comprises a request to read a characteristic from BLE Generic Attribute Profile (GATT) that is stored in the memory of the BLE-enabled peripheral device.

7. The method of claim 1, wherein the request comprises a request to write data to a memory of the BLE-enabled peripheral device storing the BLE data.

8. The method of claim 7, wherein the request to write the data comprises a request to write a characteristic to BLE Generic Attribute Profile (GATT) stored in the memory of the BLE-enabled peripheral device.

9. The method of claim 1, further comprising receiving, by the at least one processor and via a separate channel, a result of the operation comprising a response to the request.

10. The method of claim 9, wherein the separate channel is provided by the locking module.

11. The method of claim 1, wherein the locking module comprises Mutex.

12. The method of claim 1, wherein the performance of the operation comprises execution of a suspending function configured to suspend a coroutine without blocking a current thread.

13. The method of claim 12, wherein the suspending function is included in an Application Programming Interface (API) for an Android BLE framework.

14. The method of claim 1, wherein the request comprises a message generated for processing by a messenger module, the messenger module comprising the locking module and an actor, and the messenger module being configured to process the request on a dedicated thread.

15. The method of claim 1, wherein the request comprises a message generated for processing by a context module configured to communicate with the locking module and to process the request on a dedicated thread.

16. The method of claim 1, further comprising operating the at least one processor to execute a connector module configured to handle a BLE state machine, such that the connector module is configured to suspend a current operation while the connector module handles the BLE state machine.

17. The method of claim 16, wherein the connector module is further configured to maintain the current operation suspended while attempting to reestablish the BLE connection, wherein the attempting is performed until a time out event occurs.

18. The method of claim 1, wherein the BLE-enabled peripheral device comprises a vaporizer.

19. The method of claim 1, wherein the BLE-enabled peripheral device comprises a device selected from a group consisting of at least one sensor, a headset, and a wearable fitness device.

20. A Bluetooth Low Energy (BLE)-enabled mobile device, comprising:
at least one processor; and
at least one memory storing instructions which, when executed by the at least one processor, cause the BLE-enabled mobile device to at least:
establish a BLE connection with a BLE-enabled peripheral device;
after the BLE connection has been established, initiate performance of an operation related to accessing BLE services at the BLE-enabled peripheral device;
determine whether the BLE connection is available;
suspend performance of the operation if it is determined that the BLE connection is unavailable, wherein the performance of the operation is suspended without blocking a current thread; and
resume the performance of the operation if it is determined that the BLE connection is available.

21. The BLE-enabled mobile device of claim 20, wherein the instructions, when executed by the at least one processor, further cause the BLE-enabled mobile device to resume the performance of the suspended operation if it is determined that the unavailable BLE connection becomes available.

22. The BLE-enabled mobile device of claim 20, wherein the instructions, when executed by the at least one processor, further cause the BLE-enabled mobile device to generate a result of the operation when the performance of the operation is resumed.

23. The BLE-enabled mobile device of claim 20, wherein the BLE-enabled peripheral device comprises a vaporizer.

24. The BLE-enabled mobile device of claim 20, wherein the BLE-enabled peripheral device comprises a device selected from a group consisting of at least one sensor, a headset, and a wearable fitness device.

25. A method, comprising:
establishing, by a first device, a Bluetooth Low Energy (BLE) connection with a second device;
sending, by the first device, a request to access a BLE data pertaining to one or more BLE services available at the second device; and
in response to determining that the BLE connection is unavailable, suspending, at the first device, a first coroutine performing an operation to access the BLE data pertaining to the one or more BLE services at the second device.

26. The method of claim 25, further comprising:
in response to determining that the BLE connection is available, resuming, at the first device, the first coroutine performing the operation to access the BLE data pertaining to the one or more BLE services at the second device.

27. The method of claim 25, further comprising:
determining, based at least on a lock state of a locking module at the first device, a connection state of the BLE connection with the second device, the locking module being locked while the BLE connection is unavailable, and the locking module being unlocked while the BLE connection is available.

28. The method of claim 27, wherein the request comprises a message generated for processing by a messenger module at the first device, and wherein the messenger module includes the locking module and an actor module executing the first coroutine.

29. The method of claim 25, wherein the request comprises a request to discover the one or more BLE services available at the second device.

30. The method of claim 25, wherein the request comprises a read request to read at least a portion of the BLE data stored in a memory of the second device.

31. The method of claim 30, wherein the read request comprises a request to read a characteristic from a BLE Generic Attribute Profile (GATT) that is stored in the memory of the second device.

32. The method of claim 25, wherein the request comprises a write request to write BLE data to a memory of the second device.

33. The method of claim 32, where in the write request comprises a request to write a characteristic to a BLE Generic Attribute Profile (GATT) stored in the memory of the second device.

34. The method of claim 25, wherein a second coroutine performing a different operation is executed during a suspension of the first coroutine.

35. The method of claim 25, wherein the second device comprises a vaporizer device, a sensor, a headset, or a wearable fitness device.

36. An apparatus, comprising:
at least one data processor; and
at least one memory storing instructions, which when executed by at least one data processor, result in operations comprising:
establishing a Bluetooth Low Energy (BLE) connection with another apparatus;
sending, to the other apparatus, a request to access a BLE data pertaining to one or more BLE services available at the other apparatus; and
in response to determining that the BLE connection is unavailable, suspending a first coroutine performing an operation to access the BLE data pertaining to the one or more BLE services at the other apparatus.

37. The apparatus of claim 36, further comprising:
in response to determining that the BLE connection is available, resuming the first coroutine performing the operation to access the BLE data pertaining to the one or more BLE services at the other apparatus.

38. The apparatus of claim 36, further comprising:
determining, based at least on a lock state of a locking module at the apparatus, a connection state of the BLE connection with the other apparatus, the locking module being locked while the BLE connection is unavailable, and the locking module being unlocked while the BLE connection is available.

39. The apparatus of claim 38, wherein the request comprises a message generated for processing by a messenger module at the apparatus, and wherein the messenger module includes the locking module and an actor module executing the first coroutine.

40. The apparatus of claim 36, wherein the request comprises a request to discover the one or more BLE services available at the other apparatus.

41. The apparatus of claim 36, wherein the request comprises a read request to read at least a portion of the BLE data stored in a memory of the other apparatus.

42. The apparatus of claim 41, wherein the read request comprises a request to read a characteristic from a BLE Generic Attribute Profile (GATT) that is stored in the memory of the other apparatus.

43. The apparatus of claim 36, wherein the request comprises a write request to write BLE data to a memory of the other apparatus.

44. The apparatus of claim 43, where in the write request comprises a request to write a characteristic to a BLE Generic Attribute Profile (GATT) stored in the memory of the other apparatus.

45. The apparatus of claim 36, wherein a second coroutine performing a different operation is executed during a suspension of the first coroutine.

46. The apparatus of claim 36, wherein the other apparatus comprises a vaporizer device, a sensor, a headset, or a wearable fitness device.

* * * * *